(12) United States Patent
Shah et al.

(10) Patent No.: US 12,543,969 B2
(45) Date of Patent: Feb. 10, 2026

(54) MULTILAYER PCB-BASED COIL ARRAY FOR SENSOR LOCALIZATION IN MAGNETOENCEPHALOGRAPHY

(71) Applicant: QuSpin, Inc., Louiville, CO (US)

(72) Inventors: Vishal Shah, Louisville, CO (US); Cody Doyle, Broomfield, CO (US); James Osborne, Erie, CO (US); David Bobela, Golden, CO (US)

(73) Assignee: QuSpin, Inc., Louisville, CO (US)

( * ) Notice: Subject to any disclaimer, the term of this patent is extended or adjusted under 35 U.S.C. 154(b) by 71 days.

(21) Appl. No.: 18/610,604

(22) Filed: Mar. 20, 2024

(65) Prior Publication Data

US 2025/0169712 A1 May 29, 2025

Related U.S. Application Data

(60) Provisional application No. 63/603,093, filed on Nov. 27, 2023.

(51) Int. Cl.
*A61B 5/06* (2006.01)
*A61B 5/00* (2006.01)
(Continued)

(52) U.S. Cl.
CPC ............. *A61B 5/062* (2013.01); *A61B 5/245* (2021.01); *A61B 5/6803* (2013.01);
(Continued)

(58) Field of Classification Search
CPC ....... A61B 5/062; A61B 5/245; A61B 5/6803; A61B 5/24–248; A61B 2560/0223;
(Continued)

(56) References Cited

U.S. PATENT DOCUMENTS 11,415,641 B2    8/2022  Bednarke
2018/0313908 A1* 11/2018 Knappe ............... G01R 33/0035
(Continued)

OTHER PUBLICATIONS

Pfeiffer, Christoph, et al. "Localizing on-scalp MEG sensors using an array of magnetic dipole coils." PLoS One 13.5 (2018): e0191111. (Year: 2018).*
(Continued)

*Primary Examiner* — Sean D Mattson
(74) *Attorney, Agent, or Firm* — Patricia C. Brzostowicz; Superior Patent Group, LLC Superior, CO

(57) ABSTRACT

The present application is drawn to a system and method, as well as method for manufacture of a device and system for determining the position and orientation of at least one magnetic field sensor comprising: a rigid structure comprising an array of at least five electromagnetic coils; at least one wire that connects to and powers the electromagnetic coils; wherein the placement and orientation of the electromagnetic coils on the rigid structure are predetermined; wherein the electromagnetic coils, each having a predefined magnetic moment per unit current, are constructed with a printed circuit board (PCB) comprising at least one conductive layer; and wherein the system is configured such that a stray magnetic field emanating from the at least one, as measured at the location of the at least one magnetic field sensor, generates substantially lower magnetic field intensity than that produced by each of the at least five electromagnetic coils.

20 Claims, 12 Drawing Sheets

(51) Int. Cl.
*A61B 5/245* (2021.01)
*G01R 33/00* (2006.01)

(52) U.S. Cl.
CPC .. *G01R 33/0023* (2013.01); *A61B 2560/0223* (2013.01); *A61B 2562/0223* (2013.01); *A61B 2562/12* (2013.01); *A61B 2562/166* (2013.01)

(58) Field of Classification Search
CPC ........ A61B 2562/0223; A61B 2562/12; A61B 2562/166; G01R 33/0023
See application file for complete search history.

(56) References Cited

U.S. PATENT DOCUMENTS

| | | | |
|---|---|---|---|
| 2021/0011094 A1* | 1/2021 | Bednarke | A61B 5/6814 |
| 2023/0074561 A1* | 3/2023 | Park | A61B 5/065 |

OTHER PUBLICATIONS

Pfeiffer, Christoph, et al. "On-scalp MEG sensor localization using magnetic dipole-like coils: A method for highly accurate co-registration." NeuroImage 212 (2020): 116686. (Year: 2020).*
S. Baillet, "Magnetoencephalography for brain electrophysiology and imaging," Nat. Neurosci., vol. 20, No. 3, pp. 327-339, Mar. 2017, doi: 10.1038/nn.4504.
H. Weinstock, SQUID sensors: fundamentals, fabrication, and applications. Springer, 1996.
M. J. Brookes et al., "Magnetoencephalography with optically pumped magnetometers (OPM-MEG): the next generation of functional neuroimaging," Trends Neurosci., vol. 45, No. 8, pp. 621-634, Aug. 2022, doi: 10.1016/j.tins.2022.05.008.
R. Zetter, J. Iivanainen, and L. Parkkonen, "Optical Co-registration of MRI and On-scalp MEG," Sci. Rep., vol. 9, No. 1, pp. 1-9, Apr. 2019, doi: 10.1038/s41598-019-41763-4.
Z. Gao, F. Cao, N. An, and X. Ning, "Automatic co-registration of OPM-MEG and MRI using a 3D laser scanner," Measurement, vol. 223, p. 113729, Dec. 2023, doi: 10.1016/j.measurement.2023.113729.
M. Pang, Z. Huang, Z. Ding, and B. Han, "Co-Registration Error Analysis and Array Calibration for OPM-MEG System," IEEE Trans. Instrum. Meas., vol. 71, pp. 1-12, 2022, doi: 10.1109/TIM.2022.3216411.
E. Boto et al., "Moving magnetoencephalography towards real-world applications with a wearable system," Nature, vol. 555, No. 7698, pp. 657-661, Mar. 2018, doi: 10.1038/nature26147.
R. Zetter, J. Iivanainen, M. Stenroos, and L. Parkkonen, "Requirements for Coregistration Accuracy in On-Scalp MEG," Brain Topogr., vol. 31, No. 6, pp. 931-948, Nov. 2018, doi: 10.1007/s10548-018-0656-5.
A. Borna et al., "Cross-Axis projection error in optically pumped magnetometers and its implication for magnetoencephalography systems," NeuroImage, vol. 247, p. 118818, Feb. 2022, doi: 10.1016/j.neuroimage.2021.118818.
C. Pfeiffer et al., "On-scalp MEG sensor localization using magnetic dipole-like coils: A method for highly accurate co-registration," NeuroImage, vol. 212, p. 116686, May 2020, doi: 10.1016/j.neuroimage.2020.116686.
Li, Zhenning et al., "Design of coils on printed circuit board for inductive power transfer system", IET Power Electronics, Nov. 20, 2018.
Pfeiffer, Christoph, et al., "On-scalp MEG sensor localization using magnetic dipole-like coils: A method for highly accurate co-registration", NeuroImage, 212, p. 116686, Feb. 28, 2020.
Weinstock, Harold, SQUID Sensors: Fundamentals, Fabrication, and Applications, Applied Sciences, vol. 329.
EPO Search Report Letter, Jul. 23, 2024, Reference No. PP96-304-EP, Application No. 24180023.4-1113, Applicant QuSpin, Inc.

* cited by examiner

MULTILAYER PCB-BASED COIL ARRAY FOR SENSOR LOCALIZATION IN MAGNETOENCEPHALOGRAPHY

The following application is an application for patent under 35 USC 111 (a). This invention was made with government support, NIH grant number R44MH110288. The government has certain rights in the invention.

FIELD OF THE DISCLOSURE

This disclosure relates to the field of magnetoencephalography, specifically a device and method for locating sensors in a magnetoencephalography array.

BACKGROUND

Magnetoencephalography (MEG) is a non-invasive neuroimaging technique that measures the magnetic fields generated by neural activity in the brain. MEG provides critical insights into the functional organization and neural dynamics within the brain. One of the central challenges in MEG is the accurate reconstruction of the neural signal source within the brain. This reconstruction process relies heavily on precise knowledge of the position and orientation values of MEG magnetic field sensors with respect to the brain. The process of obtaining localization parameters, including sensor coordinates, axes orientations, and sometimes calibration values, with respect to the subject's head, is known as co-registration or sensor localization.

In traditional MEG systems, particularly those using Superconducting Quantum Interference Devices (SQUIDs), the helmet containing the magnetic field sensors has a fixed geometry. This means the relative positions and orientations of the sensors are predetermined and remain constant for each measurement. In such systems, localization primarily involves determining the position of the subject's head in relation to this fixed array of sensors. While this setup offers a degree of stability and consistency, it also imposes limitations in terms of flexibility and adaptability to individual head shapes and sizes.

The advent of on-scalp MEG, including systems using Optically Pumped Magnetometers (OPMs), and other advanced sensor technologies, has introduced new possibilities but also challenges pertaining to sensor localization. Unlike the fixed helmet design of traditional SQUID-based MEG systems, on-scalp MEG allows for flexible placement of sensors directly on the scalp. This flexibility enables a more customized fit for individual subjects, potentially enhancing signal quality and comfort. However, it also exacerbates the challenge of sensor localization. Since the sensors in on-scalp MEG can be positioned variably over the head, their precise locations and orientations must be determined for each new recording session. This requirement for dynamic localization adds complexity to the MEG measurement process and necessitates the development of innovative solutions to accurately and efficiently locate each sensor in relation to the subject's head.

Current co-registration methods often involve complex and time-consuming procedures to ascertain each sensor's exact position and orientation relative to the brain. These methods may include optical or electromagnetic tracking, or the use of other spatial mapping technologies. While these techniques can be effective, they add layers of complexity and operational time to the MEG procedure, which can be particularly challenging in clinical or research settings where time and simplicity are of the essence.

In OPM-MEG, the challenges of sensor co-registration are further exacerbated because, unlike SQUIDs, the internal calibration of the OPM sensors can be inaccurate. In addition to the poor internal calibration of the sensor, the OPM sensor axes can also be poorly defined and do not always align with the expected directions. This misalignment is primarily due to Cross-Axis Projection Errors (CAPE). Consequently, even if a rigid helmet is used with or without other advanced localization techniques, CAPE will result in poorly defined source localization parameters.

In 2020, a method described in a paper published by the Karolinska Institute, C. Pfeiffer et al., "On-scalp MEG sensor localization using magnetic dipole-like coils: A method for highly accurate co-registration," NeuroImage, Vol. 212, p. 116686, May 2020, hereinafter "Pfeiffer et al., 2020", on sensor localization in magnetoencephalography (MEG) represented a significant advancement in the field. Their approach was particularly well adapted for on-scalp MEG. Pfeiffer et al., 2020 introduced a method that uses magnetic dipole-like coils attached to the head for sensor localization. The Pfeiffer et al., 2020 method inverted the conventional head localization approach. Instead of localizing the dipole coils attached to the head relative to a fixed sensor array, as in traditional MEG systems, the Pfeiffer et al., 2020 method localized the sensors attached to the head relative to the dipole coils. This inversion was a good advancement for on-scalp MEG, where sensor positions vary with each subject. However, this inversion of the problem, from localizing coil positions using sensors with predetermined positions and orientations to determining sensor positions and orientations using coils at fixed locations, also shifted the challenge. The critical task became to accurately ascertain the precise position of the coils which can be equally challenging. Inasmuch, Pfeiffer alluded to this remaining challenge in his work reciting: "The measurements reported here were part of a series of benchmarking recordings to compare an on-scalp MEG system to a commercial, whole-head MEG system. It was therefore possible to use full-head recordings of the coil array on the subject's head in order to reliably estimate the positions and orientations of the dipolar coils. This is, however, not a viable solution for on-scalp systems in general."

SUMMARY OF THE DISCLOSURE

The present disclosure is drawn to a device and method for determining the position and orientation, and optionally calibration, of at least one magnetic field sensor comprising: a rigid structure comprising an array of at least five electromagnetic coils comprised of an electrically conductive coil trace and at least five wires that connect to and power the electromagnetic coils; wherein the placement and orientation of the electromagnetic coils on the rigid structure are predetermined; wherein the electromagnetic coils, each having a predefined magnetic moment per unit current, are constructed with a printed circuit board (PCB) comprising at least one conductive layer; and wherein the system is configured such that a stray magnetic field emanating from the wires and/or any connecting traces, as measured at the location of the at least one magnetic field sensor, generates less than 1% of a magnetic field intensity (SI units of Telsa) produced by each of the at least five electromagnetic coils. The present disclosure is further drawn to a method of determining position and orientation of at least one magnetic field sensor, and manufacture of such a device.

The objective of the disclosure is to address the challenge of accurately determining coil positions, orientations, and optionally calibrations, using a prefabricated electromagnetic coil array made with a Printed Circuit Board (PCB). This approach ensures that the positions and orientations of the electromagnetic coils, referred to herein as coils, are precisely pre-defined, removing the need to localize coils with external means.

The method described herein is broadly applicable to similar use cases for biomagnetism in which magnetic sensors are employed to measure magnetic fields from other parts of the body such as the heart or the muscles wherein knowing the precise position and orientation of the sensors with very high accuracy is critically important. The term MEG is used here to encompass such similar applications.

The present disclosure comprises a device and method for sensor localization in on-scalp magnetoencephalography (MEG) systems, particularly addressing the challenges introduced by the flexible placement of sensors in on-scalp MEG systems. This disclosed device and method employs high precision coils made from a multilayer PCB mounted on a rigid platform.

An object of the disclosure is the utilization of electromagnetic coils formed with a PCB mounted to a rigid platform functioning as a unified unit to rapidly localize the position and orientation of an array of magnetic sensors. Utilizing a multilayer PCB enables the construction of small-area coils, each with a large number of turns, whose location and magnetic moments can be determined with a high degree of accuracy from manufacturing tolerances alone.

Another object of the disclosure is creating an ideal current dipole. The individual coils can be very compact allowing them to be treated as an ideal current dipole with well-known magnetic field distribution. This feature significantly simplifies the process of predicting and analyzing the magnetic fields generated by the coils, enhancing the accuracy and reliability of sensor localization.

Another object of the disclosure is creating increased number of coils. A large number of coils can be easily incorporated in one or more PCB platforms to improve the accuracy of sensor localization using more coils.

Another object of the disclosure is to reduce stray field interference produced by wires and/or connective traces. The large number of turns in each coil increases the magnetic moment per unit current, thereby increasing the magnetic field produced by the coils with a low current. This reduced current demand, in turn, diminishes the relative contribution of the stray fields produced by the wires and traces that power the coils which is necessary for localization with high accuracy.

Another object of the disclosure is to provide a precise array. The inherent precision of PCBs ensures that the magnetic moment of each coil is known from the design geometry without requiring external calibration.

Another object of the disclosure is to provide a single, unified coil unit. Using a flat or a predefined rigid structure for the PCB coil positions means that each coil is precisely positioned, removing the need for an external means to obtain the position and orientation of each coil. In addition, a unified unit is easily attached to, removed from, or placed near the MEG helmet. This simplicity in handling the PCB mounted coils significantly streamlines the workflow for MEG procedures.

Another object of the disclosure is to provide a device requiring simple, cost-effective manufacturing. By leveraging mature PCB manufacturing technology, the device significantly reduces complexity and costs typically associated with fabricating high-precision coils. This makes production both economical and scalable. Furthermore, due to the standardized nature of PCB production, the cost becomes largely independent of the number of coils incorporated in the PCB coil platform, enhancing the cost-efficiency of the system while allowing for greater design flexibility and scalability.

Another object of the disclosure is minimization of coil diameter. The diameter of the coil should be kept as small as possible such that when it is positioned a few centimeters away from the sensors, it can be approximated as an ideal current dipole. This approximation is helpful in greatly simplifying the analysis for the source localization algorithms.

Another object of the disclosure is optimization of magnetic field ratio. It is essential to maintain the ratio of the magnetic field generated by the coil compared to the stray field produced by the wires and/or traces that power the coil as low as possible. A typical target is keeping the stray field from wires powering the coil below 1% of the total field by the coil structure for accurate localization.

Another object of the disclosure is precise coil position and orientation. The position and orientation of each individual coil must be known with high precision. The accuracy required for the coil's placement is typically less than 0.1 mm, and for its orientation, less than 0.3 degrees of uncertainty. Additionally, the coil magnetic moment must be known accurately, typically with less than 1% uncertainty with respect to each other.

For example the disclosure is drawn to a system for determining position and orientation of at least one magnetic field sensor, comprising: a rigid structure comprising an array of at least five electromagnetic coils made of electrically conductive coil trace; wires that connect to and power each of the at least five electromagnetic coils; at least one printed circuit board (PCB) comprising at least one conductive layer, with the at least five electromagnetic coils constructed therein; wherein the placement and orientation of the electromagnetic coils on the rigid structure are predetermined; wherein the at least five electromagnetic coils each comprise a predefined magnetic moment per unit current; and wherein the system is configured such that, for each of the at least five electromagnetic coils, a magnetic field emanating from the wire powering the electromagnetic coils, as measured at the location of the at least one magnetic field sensor, is substantially lower than the magnetic field produced by the electromagnetic coil.

The disclosure is further drawn to the system, wherein each of the at least five electromagnetic coils are powered independently of the other electromagnetic coils. The disclosure is further drawn to the system further comprising at least one electrically conductive connecting trace connecting an electromagnetic coil and a wire. The disclosure is further drawn to the system, wherein the electrically conductive connecting trace is copper. The disclosure is further drawn to the system, wherein the individual wires powering the electromagnetic coils comprise a current carrying wire and second wire, and wherein the current carrying wire is twisted around the second wire. The disclosure is further drawn to the system, wherein the individual wires powering the electromagnetic coils comprise at least one current carrying wire and the system further comprises at least one ground wire wherein each of the current carrying wires are twisted around the at least one ground wire. The disclosure is further drawn to the system further comprising at least one additional electromagnetic coil, and a wire to supply power to the at least one additional electromagnetic coil, such that a calibration of the at least one magnetic field sensor may be determined. The disclosure is further drawn to the system, wherein each of the at least five electromagnetic coils has a surface area sufficiently small such that when each of the at least five electromagnetic coils are powered to generate the magnetic field, the magnetic field can be approximated as an ideal dipole coil at the location of the at least one of the magnetic field sensor with an accuracy of within 1%. The disclosure is further drawn to the system further comprising a processor configured to analyze the response of each of the at least one magnetic field sensors to a magnetic field generated by each of the at least five electromagnetic coils to determine the position and orientation of the at least one magnetic field sensor. The disclosure is further drawn to the system, wherein the rigid structure is the PCB, with the at least five electromagnetic coils constructed therein, comprising at least one conductive layer. The disclosure is further drawn to the system, wherein the array of at least five electromagnetic coils is constructed within a flexible PCB, with the at least five electromagnetic coils from the flexible PCB being rigidly affixed at predetermined locations and orientations on the rigid structure. The disclosure is further drawn to the system, wherein the at least five electromagnetic coils are fabricated in individual PCBs and are subsequently attached to the rigid structure at specified locations and orientations. The disclosure is further drawn to the system, wherein at least one of the electromagnetic coils is fabricated using a technique other than PCB construction while the remaining electromagnetic coils are fabricated from PCBs, and the remaining electromagnetic coils are mounted on the rigid structure at specified locations and orientations. The disclosure is further drawn to the system, wherein the at least five electromagnetic coils are energized in a sequential manner, with each electromagnetic coil being powered on to create their individually defined magnetic field individually and sequentially. The disclosure is further drawn to the system, wherein at least two electromagnetic coils are energized concurrently, with the at least two electromagnetic coils being powered simultaneously using oscillatory currents at differing frequencies. The disclosure is further drawn to the system further comprising a 3D scanning device for digitizing the spatial relationship between a subject and the rigid structure, wherein: the 3D scanning device is configured to generate a three-dimensional digital representation of the subject and the rigid structure as a unified model; the system is configured to utilize the digital representation to establish the spatial relationship between the subject and the at least one magnetic field sensor affixed to the rigid structure, enabling accurate co-registration of sensor with respect to the subject.

The disclosure is further drawn to the system, wherein the electrically conductive coil traces are copper. The disclosure is further drawn to the system of, wherein the magnetic field emanating from wires powering the at least five electromagnetic coils, as measured at the location of the at least one magnetic field sensor, is less than 1% of the magnetic field produced by any one of the at least five electromagnetic coils.

The disclosure also comprises a method for determining position and orientation of at least one magnetic field sensor comprising: forming at least five electromagnetic coils from electrically conductive coil traces and connecting them to wires to power the electromagnetic coils, wherein the at least five electromagnetic coils are fabricated in a single planar rigid PCB to build a coil array, where the locations and dipole moments of the coils are predetermined by the design geometry of the PCB, and the coils are configured such that a stray field from the wires powering the coils is less than 1% of the magnetic field produced by the coils at the location of at least one the magnetic sensors; placing the PCB array near the at least one magnetic field sensors; powering the electromagnetic coils in the PCB array with an electric current, wherein the electric current has a periodic waveform with known amplitude, frequency and phase to produce a predefined magnetic field from each electromagnetic coil; recording a response of at least one magnetic field sensor to the magnetic field produced by each of the at least five electromagnetic coils; and analyzing the response to determine the position and orientation of at least one of the magnetic field sensors.

The method may further comprise fixing an electrically conductive connecting trace between at least one electromagnetic coil and the wire powering the coil. The method may further comprise: forming at least one additional electromagnetic coil in the PCB and connecting the at least on additional electromagnetic coil to a power source; recording the response from the powered additional coil in the PCB; and analyzing the response to calibrate the at least one magnetic field sensor. The disclosure is drawn to the method, wherein the electromagnetic coils are powered simultaneously. The disclosure is drawn to the method, wherein the electromagnetic coils are powered sequentially.

In another example, the disclosure is drawn to a method for determining position and orientation of at least one magnetic field sensor comprising: fabricating at least one electromagnetic coil using an electrically conductive coil trace and connecting a wire for powering the coil thereto, wherein the electromagnetic coil is fabricated within at least one PCB unit configured such that a stray field from the wire, when powering the at least on electromagnetic coil, is substantially lower than the magnetic field produced by at least one electromagnetic coil as measured at the location of the at least one magnetic field sensor; attaching the at least one PCB unit to a rigid platform at predetermined locations and orientations to form an array; placing the array near the at least one magnetic field sensor; powering the at least one electromagnetic coil in the array with an electric current, wherein the electric current has a periodic waveform with known amplitude, frequency, and phase to produce predefined magnetic field from the at least one electromagnetic coil; recording a response of at least one magnetic field sensor to the at least one magnetic field produced by each of the at least one electromagnetic coils; and analyzing the recorded response to determine the position and orientation of at least one of the magnetic field sensors.

The disclosure is drawn to the method, wherein at least five electromagnetic coils are fabricated in the at least one PCB unit. The disclosure is further drawn to the method further comprising: forming at least one additional electromagnetic coil in the array; and recording from the at least one magnetic field sensor $t_1$, $t_2$, coil current, and magnetic field to determine calibration of the at least one magnetic field sensor.

The disclosure is further drawn to the method, wherein at least five electromagnetic coils are formed in a single PCB structure. The disclosure is further drawn to the method, wherein at least one of the electromagnetic coils is created on a distinct PCB structure, and further comprising affixing the distinct PCB structure to a rigid structure. The disclosure is further drawn to the method, wherein the at least five electromagnetic coils are sequentially powered. The disclosure is further drawn to the method, wherein the at least five electromagnetic coils are simultaneously powered. The disclosure is further drawn to the method, wherein at least ten electromagnetic coils are formed in a single PCB structure. The disclosure is further drawn to the method further comprising twisting the wire.

In another example, the disclosure is drawn to a device for determining position, orientation, and calibration of at least one magnetic field sensor comprising: at least six electromagnetic coils formed from concentric copper traces in at least two layers in at least one PCB structure; an electric wire to supply current to the at least six magnetic coils; a power supply; and a processor programmed to obtain data pertaining to time of induction and cessation of current in the at the least six magnetic coils and magnetic field produced by the at least six magnetic coils from the at least one magnetic field sensor, and further programmed to determine position, orientation, and calibration of the at least one magnetic field sensor.

The disclosure is further drawn to the device, wherein the at least six electromagnetic coils are formed in at least two PCB structures. The disclosure is further drawn to the device, wherein the at least six electromagnetic coils are formed in at least six PCB structures. The disclosure is further drawn to the device, wherein the at least six electromagnetic coils are formed in at least six PCB structures. The disclosure is further drawn to the device, wherein each electromagnetic coil is formed by vertically stacking the coil trace over at least two PCB layers. The disclosure is further drawn to device, wherein each electromagnetic coil is formed by vertically stacking the coil trace over at least four PCB layers. The disclosure is further drawn to the device, wherein each electromagnetic coil is formed by vertically stacking the coil trace over at least six PCB layers. The disclosure is further drawn to the device further comprising an MEG helmet comprising the at least one magnetic field sensor and wherein the at least one PCB structure is rigidly attached to the MEG helmet.

In another example, the disclosure is drawn to a method of manufacture of a device for determining position and orientation of at least one magnetic field sensor comprising the steps of: using at least five electrically conductive traces to create at least five electromagnetic coils in at least one printed circuit board (PCB) structure; connecting the at least five electrically conductive traces to wires to carry a current to the electromagnetic coils in a directional manner; and constructing a structure to hold the at least five electromagnetic coils in a defined location near the at least one magnetic field sensor; wherein the at least five electromagnetic coils each comprise a predefined magnetic moment per unit current; wherein the PCB comprises at least one conductive layer; and wherein the system is configured such that, for each of the at least five electromagnetic coils a magnetic field emanating from the wires powering the electromagnetic coils, as measured at the location of the at least one magnetic field sensor, is substantially lower than the magnetic field produced by each of the at least six electromagnetic coils.

The disclosure is drawn to the method of manufacture, wherein the electrically conductive trace is a copper trace. The disclosure is drawn to the method of manufacture, wherein the PCB is a rigid PCB. The disclosure is drawn to the method of manufacture, wherein the PCB is a flexible PCB. The disclosure is drawn to the method of manufacture, wherein the PCB is a planar structure. The disclosure is drawn to the method of manufacture, wherein at least two PCB structures are formed. The disclosure is drawn to the method of manufacture, wherein at least six PCB structures are formed. The disclosure is drawn to the method of manufacture, wherein the PCB comprises at least two conductive layers. The disclosure is drawn to the method of manufacture, wherein the method comprises at least three conductive layers. The disclosure is drawn to the method of manufacture, wherein the PCB comprises at least four conductive layers. The disclosure is drawn to the method of manufacture, wherein the PCB comprises more than four conductive layers.

Figure 1:
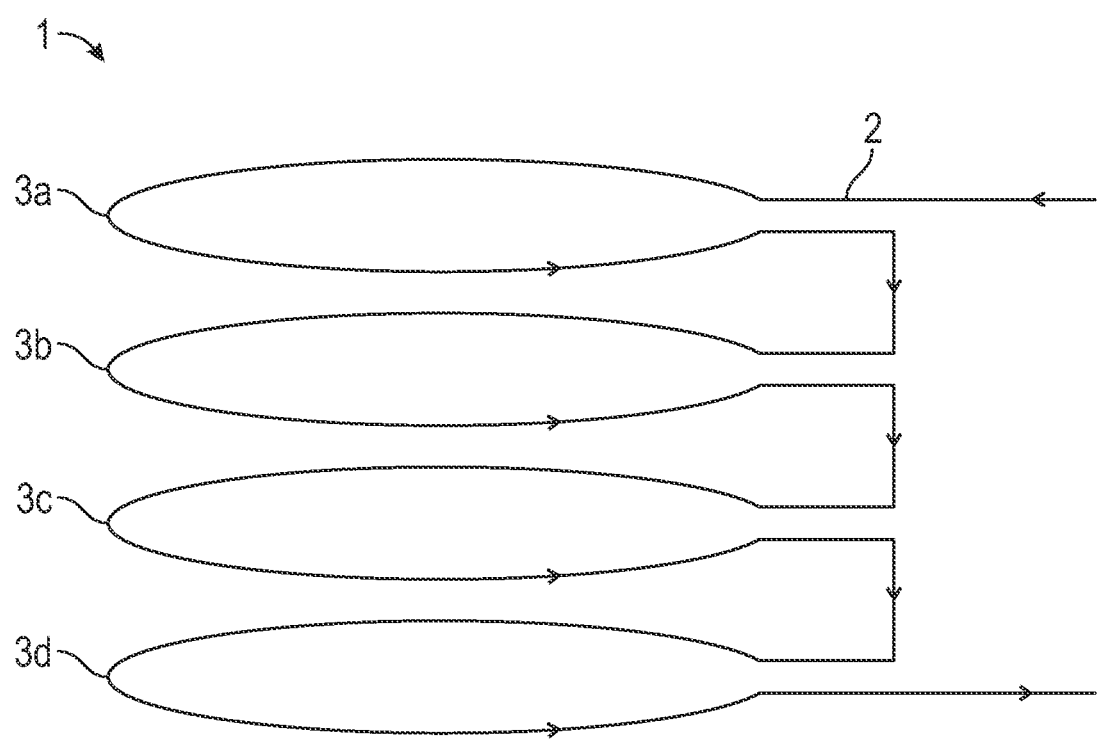
FIG. 1 is a schematic diagram illustrating coil formation of the present disclosure.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DISCLOSURE

Terms

As used herein, "printed circuit board" or "PCB", also known as a printed wiring board (PWB), refers to a specific medium used to connect wire components to one another. A PCB is formed like a laminated sandwich of repeating conductive and insulating layers, wherein the conductive layers are designed with traces, planes, and other features which may be laid or etched on one or more sheet layers and/or laminated onto and/or between the layers of non-conductive substrates.

As used herein, the term "PCB platform", as is disclosed herein, refers to a rigid structure on which a PCB coil, or coils are affixed at predetermined locations. A PCB coil is a coil embedded in a PCB as disclosed by the present application. A PCB platform may be utilized to offer extra structural support, enhancing the rigidity of the PCB coils or enabling their mounting on non-planar surfaces. In instances where the PCB is constructed from a rigid substrate like FR4, and it is preferred to have the PCB coil array on a flat surface, the PCB substrate can also serve as the PCB platform.

As used herein, the term "FR4" or "FR4 substrate" refers to a class of printed circuit board base material made from flame retardant epoxy resin and glass fabric composite.

As used herein, a "rigid PCB" is a PCB that is not flexible or easily bendable. Materials to form rigid PCB include but are not limited to FR-4, a fiberglass reinforced epoxy laminate, aluminum, and polyimide.

As used herein, a "flexible PCB" or "flexible PCBs" are a PCB that is easily bendable. Materials to form a flexible PCB include but are not limited to polyimide and polyester.

As used herein, "wires" refer to the electrical conductors external to the PCB. The wires are responsible for delivering current from an external source to the PCB thereby powering the coils and other components. The specific arrangement and types of wires can vary but are generally designed to minimize stray magnetic fields generated by current flow.

As used herein, a "trace" or "traces" or "electrically conductive traces" are the conductive pathways, typically copper, etched onto the PCB that facilitate the flow of current. The coil traces form the physical structure of loops and coils and provide a conductive pathway to connect components on the PCB. Here, the trace that brings the current in and out to power each electromagnetic coil is referred to as a connecting trace and the trace that forms the coil structure is referred to as coil trace.

As used herein, "vertical interconnect access" or "VIA", refers to a layered connection in form of a metallized or drilled hole in a printed circuit board that provides a conductive path to connect copper traces, or provide space for copper trace to span, to two or more separate layers of the PCB.

Figure 2:
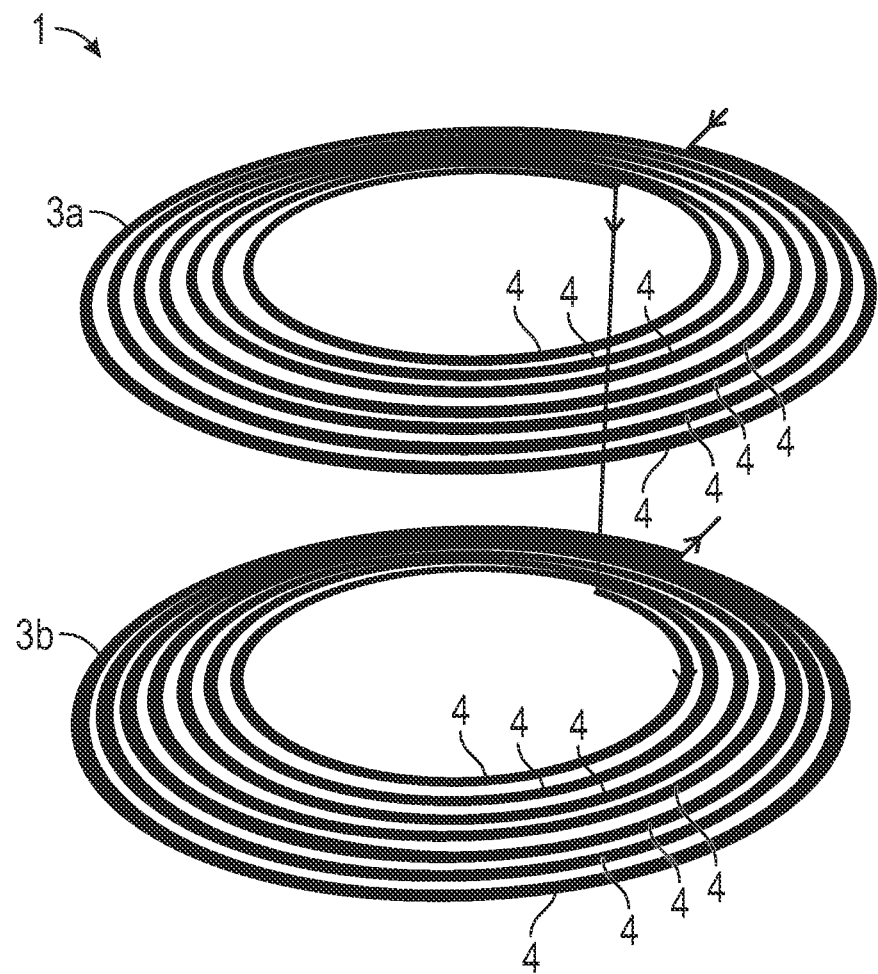
FIG. 2 is a schematic diagram illustrating an expanded example of coil formation of the disclosure.

As used herein, a "loop" is a conductive trace on a single layer of a printed circuit board (PCB), shaped in a specific geometry such as a circle or square. The loop is designed to partially enclose an area to optimize magnetic field generation when current flows through it. While traditionally circular or square, it may be formed in any shape and can also be part of a larger, more complex multi-loop structure like a spiral, which extends across multiple turns to enhance the magnetic field generation. A loop may comprise one turn of a connecting turned coil trace 2 as illustrated in FIG. 1 or multiple turns 4 of a coil trace in levels 3a, 3b, as illustrated in FIG. 2. As used herein, a "coil" is a multilayer collection of interconnected loops vertically stacked on top of each other across different layers of the PCB. These loops, whether individual or part of multi-loop structures such as spirals, collectively function as a unified entity to produce a desired magnetic field when current is introduced. The vertical stacking and interconnection of loops across layers forms a coil that sums the magnetic field produced by individual loops.

As used herein, "ideal dipole coil" refers to a coil with a substantially small effective diameter relative to the distance from the coil where the magnetic field is measured. A coil approximates the "ideal dipole coil" as the distance from the coil increases. For example, the magnetic field measured at a location that is 10 times the coil diameter, is predicted to be about 1% of the true value, calculated from Biot-Savart Law, using a simple analytical equation characteristic of a magnetic dipole field.

For an ideal dipole coil, assuming it is a coil with small loop diameter compared to the observation distance, the magnetic field at a point in space is given by the vector formula:

$$B(r) = \frac{\mu_0}{4\pi}\left(\frac{3(m \cdot \hat{r})\hat{r} - m}{r^3}\right) \quad \text{(Eq. 1)}$$

Where, $\mu_0$ is the permeability of free space, r is the position vector from the dipole to the point where the field is calculated, $\hat{r}$ is the unit vector in the direction of the r, r is the magnitude of the position vector r, and m is the magnetic moment vector.

As used herein, "magnetic moment" or "magnetic dipole moment" is a vector quantity that represents the strength and orientation of a coil's magnetic field.

As used herein, "stray magnetic field" or "stray field" refers to any magnetic field produced by the current driving the coils, originating from sources other than the coil itself. Examples of sources that produce stray fields include the electrically conductive traces, wires, or the electronic controllers that generate or transmit the current used to drive the coils.

As used herein, "distinct" refers to a separate entity or structure. For instance, wherein in a structure is already recited and a distinct structure is recited, the distinct structure represents a second, separate structure.

As used herein, "substantially" is defined as to a great or significant extent, for the most part, or essentially. For example, a substantially lower stray magnetic field produced by wires and traces of the device, as measured at the location of a magnetic field sensor, of the present disclosure would be at least 98% lower than the magnetic field produced by an electromagnetic coil of the present disclosure, or in a preferred embodiment 99% lower than the magnetic field produce by an electromagnetic coil of the present disclosure. In other terms, the stray magnetic field would be substantially negligible compared to that of an electromagnetic coil, being less than 2%, or less than 1% of that produced by an electromagnetic coil.

As used herein, "design geometry" refers to the specific shape, dimensions, configurations, and arrangements of elements within the system encompassing the physical form and layout of the design.

As used herein, a "subject" is defined as an entity that is undergoing MEG, whether human, animal, or other entity.

DESCRIPTION OF THE DISCLOSURE

The present invention provides a detailed description of a printed circuit board (PCB) electromagnetic coil capable of generating a significant magnetic field upon energizing. The PCB coil is composed of numerous loops, each crafted from conductive copper traces arranged into predefined shapes such as circles, squares, or spirals on individual PCB layers. The loops are stacked vertically, forming a multi-layered coil. This structure is designed to augment the coil's magnetic moment substantially.

The loops are interconnected through electrical VIAs (Vertical Interconnect Access) that extend across different PCB layers. The configuration is such that the electrical current traverses the loops on successive layers in the same direction. This consistency ensures that the magnetic fields from each loop reinforce the total field generated by the coil.

Figure 3:
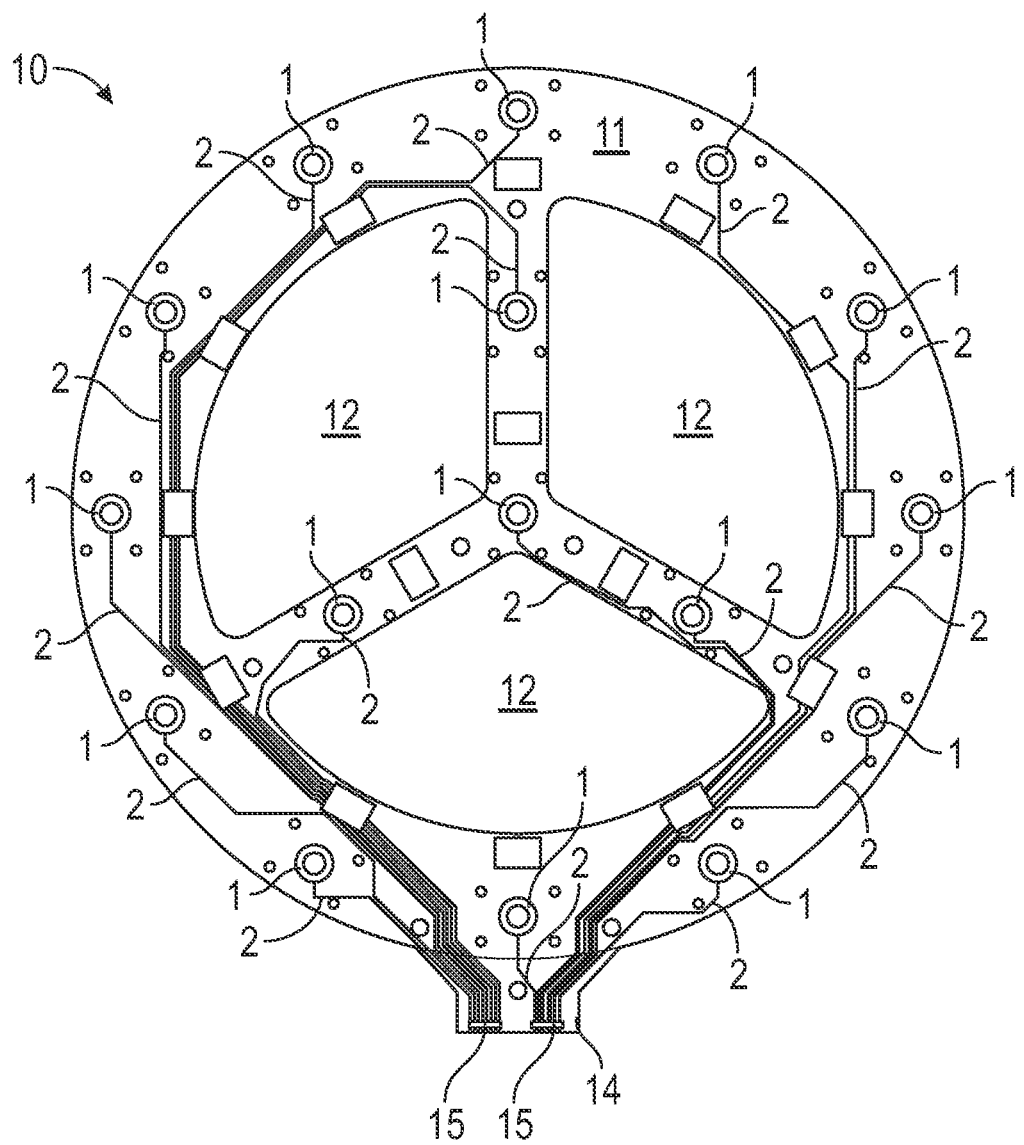
FIG. 3 is a schematic diagram illustrating the PCB coil platform of the present disclosure.

For illustrative purposes, FIG. 1 depicts a schematic of a multi-layered PCB coil 1. This PCB coil 1 includes, in this example, four distinct loops, 3a, 3b, 3c, and 3d, with each positioned on a different PCB layer. Formed from a single electrically conductive coil trace, which may be copper trace, every loop 3a, 3b, 3c, 3d encloses a finite area such that it produces a substantial magnetic field when a current is introduced. The loops 3a, 3b, 3c, 3d are not only vertically arranged but are also electrically connected via VIAs that are extensions of the electrically conductive coil trace. This permits the current to pass in sequence from loop 3a on the first layer to loop 3d on the last layer, as is illustrated by the arrows in FIG. 1. As illustrated in FIGS. 1 and 3, an electrically conductive connecting trace 2 may carry current from a wire to power the PCB coil 1. The electrically conductive connecting trace 2 may be the same trace as the electrically conductive coil trace that forms loops 3a, 3b, 3c, and 3d.

This sequential flow of current is maintained in the same direction across all the layers, as the arrows indicate. Such alignment of current flow is critical as it causes the magnetic fields from the individual loops 3a, 3b, 3c, 3d to sum together, thereby bolstering the coil's 1 total magnetic field strength. Consequently, the coil 1 operates as a unified entity with an enhanced magnetic moment, leading to an amplified magnetic field generated when it is energized.

Electrically conductive coil trace may form as few as one, or as few as two, or as few as three, or as few as four, or as few as 5, or at least 6, or at least 7, or at least 8, or at least 9, or at least 10, or at least 20, or at least 30, or at least 40, or at least 50, or at least 60, or at least 70, or at least 80, or at least 90, or at least 100, or at least 110, or at least 120, or at least 130 or more loops 4 in different layers 3a, 3b, 3c, 3d of the PCB as depicted in FIGS. 1-2.

A PCB coil 1 is designed as a multilayer structure, providing the advantage of more turns and loops in each coil to increase the magnetic moment without increasing the overall diameter of each coil. The diameter of each coil may for instance span at least 0.1 cm, or at least 0.2 cm, or at least 0.3 cm, or at least 0.4 cm, or 0.5 cm, or 0.6 cm, or 0.7 cm, or 0.8 cm, or 0.9 cm, or 1 cm, or more. For instance, the diameter of each coil may be at least 0.1 cm to 1 cm, or 0.1 to 2 cm or 0.1 to 3 cm, or more. This multilayer approach allows for an increased dipole moment per unit current to be accommodated within a small, enclosed loop area allowing each coil to be approximated as an ideal current dipole due to its small diameter while increasing the ratio of the magnetic field generated by the coil to the stray field produced by the traces and wires connected to and powering the coils.

As illustrated in FIG. 2, the coil traces may be laid out as a layer 3a made up of one or more loops 4 of coil traces within each layer of the PCB. The layers 3a, 3b on multiple layers of the PCB are interconnected by the coil trace or VIA trace to form a PCB coil 1 of FIG. 1. A layer 3a, 3b composed of as few as one loop 4 may be employed per layer, or a layer 3a, 3b may be as formed of 2 loops, or 3 loops, or 4 loops, or 5 loops, or 10 loops, or 20 loops, or 30 loops, or 40 loops, or 50 loops, or 60 loops, or 70 loops, or 80 loops, or 90 loops, or 100 loops, or more, within a layer 3a, 3b. The loops on different layers of the PCB are interconnected by a VIA trace. The arrow indicates the direction of current which enters through the trace at layer 3a, the first PCB layer, and circulates within it, then exits. Upon exiting loop 3a, the current progresses to loop 3b on the second PCB layer using a conductive VIA that electrically connects the two. The current continues to flow in the same direction around loop 3b, then proceeds to other layer loops, if present, until it exits from the final layer and returns to the coil's power source. As the current traverses this vertical array of loops, a magnetic field is generated, transforming the PCB structure into an electromagnetic coil.

As illustrated in FIGS. 1-2, increasing the number of loops 4 within each layer 3a, 3b, 3c, 3d and using vertical integration, e.g. increased number of vertical layers 3a, 3b, 3c, and 3d of loops 4 of copper trace, the overall magnetic moment of the combined coil structure is increased. More loops 4 within a single layer, 3a, 3b, 3c, 3d and increased number of layers of loops result in a stronger magnetic field being generated from the same amount of current flowing through the coil 1. This multilayer loop-based coil approach allows generating a stronger magnetic field per unit current. The coil's increased magnetic moment is achieved through this device and method simplifies the sensor localization process without expanding the coil's 1 physical size which in turn allows the coil to be treated as an ideal dipole.

In the construction of a PCB coil 1, the geometry presented in FIGS. 1-2 in layers 3a, 3b, 3c, 3d and loops 4 as circular is not limited to any specific geometry or shape but is instead selected based on two primary criteria. First, it is advantageous for the geometry of the coil to be of a shape whose magnetic field distribution can be precisely calculated with analytical equations. This consideration ensures that the magnetic field distribution generated by the coils can be easily predicted, thus reducing the computational load in running sensor localization algorithms. Second, the chosen coil geometry should inherently produce a substantial dipole moment per such that a strong magnetic field can be produced while requiring a low electrical current. Minimizing the current required to energize the coils reduces the stray magnetic field by the current which improves the accuracy of sensor localization. The shape of the coil traces forming loops may be squares, triangles, hexagonal, or any other shape that fulfills these two criteria.

FIG. 3 illustrates a PCB coil array 10 of the present disclosure. Multiple PCB coils 1 are arranged within a PCB board 11 and connected to wires via connecting traces 2. Alternately, wires may connect directly with the PCB coils 1. The number of PCB coils 1 may for instance be at least 1 to 36 or more, for instance at least 2, or at least 3, or at least 4, or at least 5, or at least 6, or at least 7, or at least 8, or at least 9, or at least 10, or at least 11, or at least 12, or at least 13, or at least 14, or at least 15, or at least 16, or at least 17, or at least 18, or at least 19, or at least 20, or at least 22, or 24, or 26, or 28, or 30, or 32, or 34, or 36, or 40, or more. In one example embodiment at least five or more PCB coils with independently driven current may be used to create an array to obtain five key parameters of each sensor. These parameters encompass three spatial position coordinates of each sensor (x, y, z coordinates), two for orientation (theta and phi angles) of each sensor axis. An additional PCB coil may optionally be used for calibration of the sensor output along each sensor axis, wherein the calibration is defined as the sensor response, in units such as volts, per unit change in magnetic field vector along the sensor axis. Some systems may not require calibration or may be externally calibrated by other means.

Referring again to FIG. 3, optional open spaces 12 in the PCB coil array 10 decrease weight when the space is not needed for coils. Multiple PCB coils 1 can be patterned within the PCB array 10, spaced away from each other to uniformly, or non-uniformly, in the PCB array 10. Each PCB coil 1 in the array is operated independently, ensuring that the magnetic field generated by each coil can be individually distinguished by the sensors during the localization process. A connector 14 for attaching wire(s) 15 that power the coils 1 may be mounted on the PCB array 10 or be manufactured into the PCB array platform 10. Arrows indicate direction of charge. Wire(s) 15 connect to the optional connecting traces 2 and carry power to the PCB coil(s) 1. Each wire 15 necessarily would be made up of at least a pair of wires, being at least two wires, with one wire carrying current to the coil and another wire acting as a neutral, ground, or cold wire. Alternately one ground wire may be employed for multiple wires carrying current.

Figure 4:
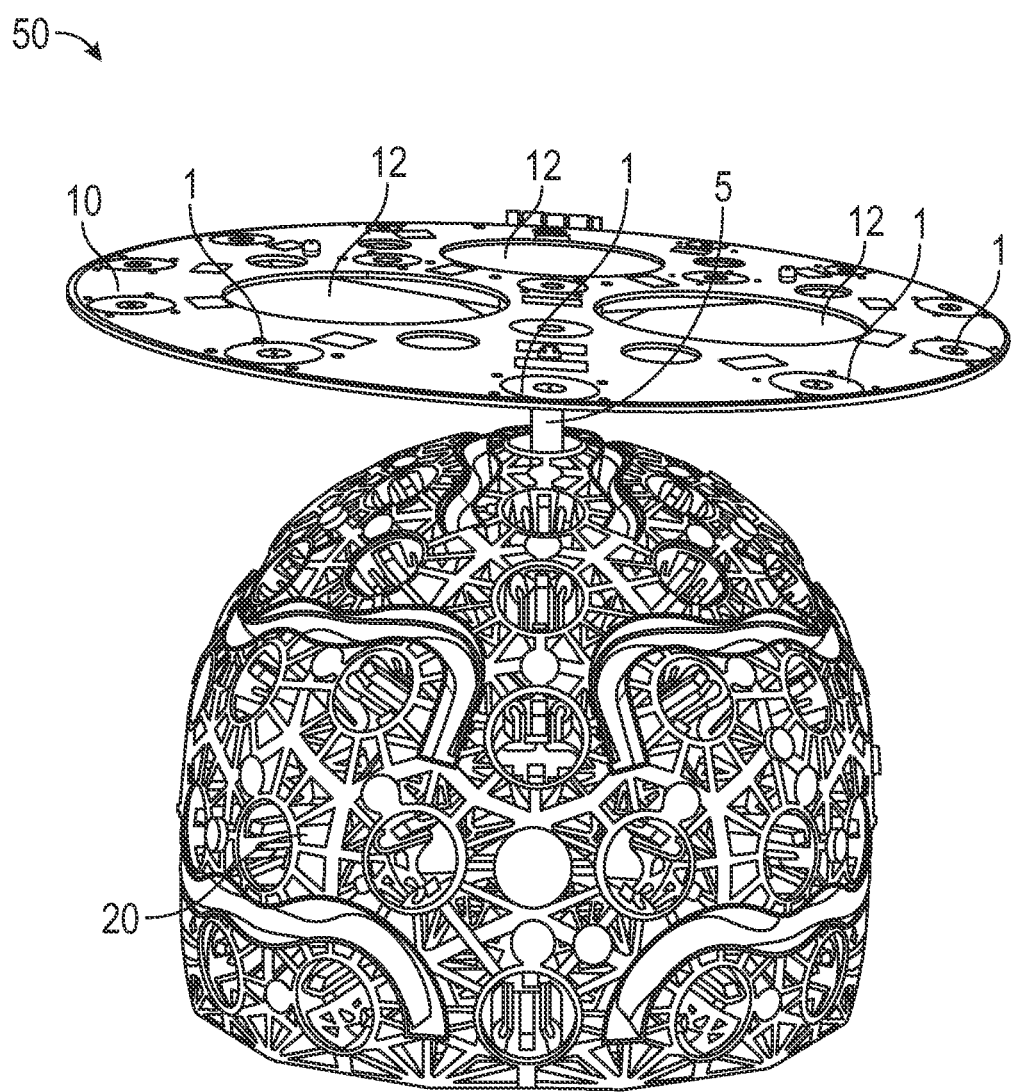
FIG. 4 is an illustration of an MEG helmet-PCB coil platform device of the present disclosure.

As illustrated in FIG. 4, an example of a mounting configuration for the PCB coil array platform 10 involves its direct attachment to a MEG helmet 20 to create a paired MEG helmet-PCB coil array device 50. The direct mounting approach is particularly advantageous in scenarios where head movement may be expected. By securing the PCB coil platform 10 rigidly to the helmet 20, the helmet 20, comprising the magnetic field sensors, and the PCB coil platform 10, move in unison, removing any relative movement between the two. As a result, potential discrepancies in sensor localization due to head motion are effectively eliminated. In situations where helmet movement during the co-registration process is minimal or can be controlled, the PCB coil platform 10 does not necessarily have to be rigidly attached to the helmet but can instead be positioned in close proximity to the helmet. Close proximity in the presented examples may be about 1 cm away, or about 2 cm away, or about 3, or about 4, or about 5, or about 6, or about 7, or about 8, or about 10, or about 12, or more.

It is preferable to design the PCB coils 1 on the PCB coil platform 10 so that each coil can be powered separately and independently. This is achieved by connecting individual electrical wires to each coil, allowing for distinct control over the current supplied to each one. These electrical wires, and optionally electrically conductive connecting traces are crucial for delivering a known current to each coil. While a direct current (DC) can be used, an alternating current (AC) with a periodic waveform, such as sinusoidal, is ideal. The use of AC at a specific known frequency aids in distinguishing the magnetic field generated by the coils from background fields originating from unrelated sources. This distinction is vital for accurate sensor localization in the presence of environmental magnetic noise or residual background magnetic field.

The coils on the PCB array can be activated in a several different ways, for example, all or a group of PCB coils can be powered on simultaneously, with each simultaneously activated coil operating at a different known frequency. This approach is similar to the method described in the Pfeiffer et al., 2020 and allows for the simultaneous recording of responses from multiple coils, each distinguished by its unique frequency. Alternately the coils 1 can be powered on one at a time. This sequential activation can simplify the process of isolating each coil's contribution to the overall magnetic field but may extend the total time required for sensor localization. Alternatively, the coils may be powered on in sets of 2 or more.

The magnitude of the current supplied to each coil is a critical parameter. It should be set to ensure that the coils produce a magnetic field strong enough to be detected with a high signal-to-noise ratio by the sensors, but not so strong as to cause sensor saturation. Balancing the intensity of the coil's magnetic field with the sensitivity of the sensors is key to achieving reliable and accurate localization results. This is particularly important for sensors such as OPMs that have a small range in which the sensor response is linear.

Figure 5:
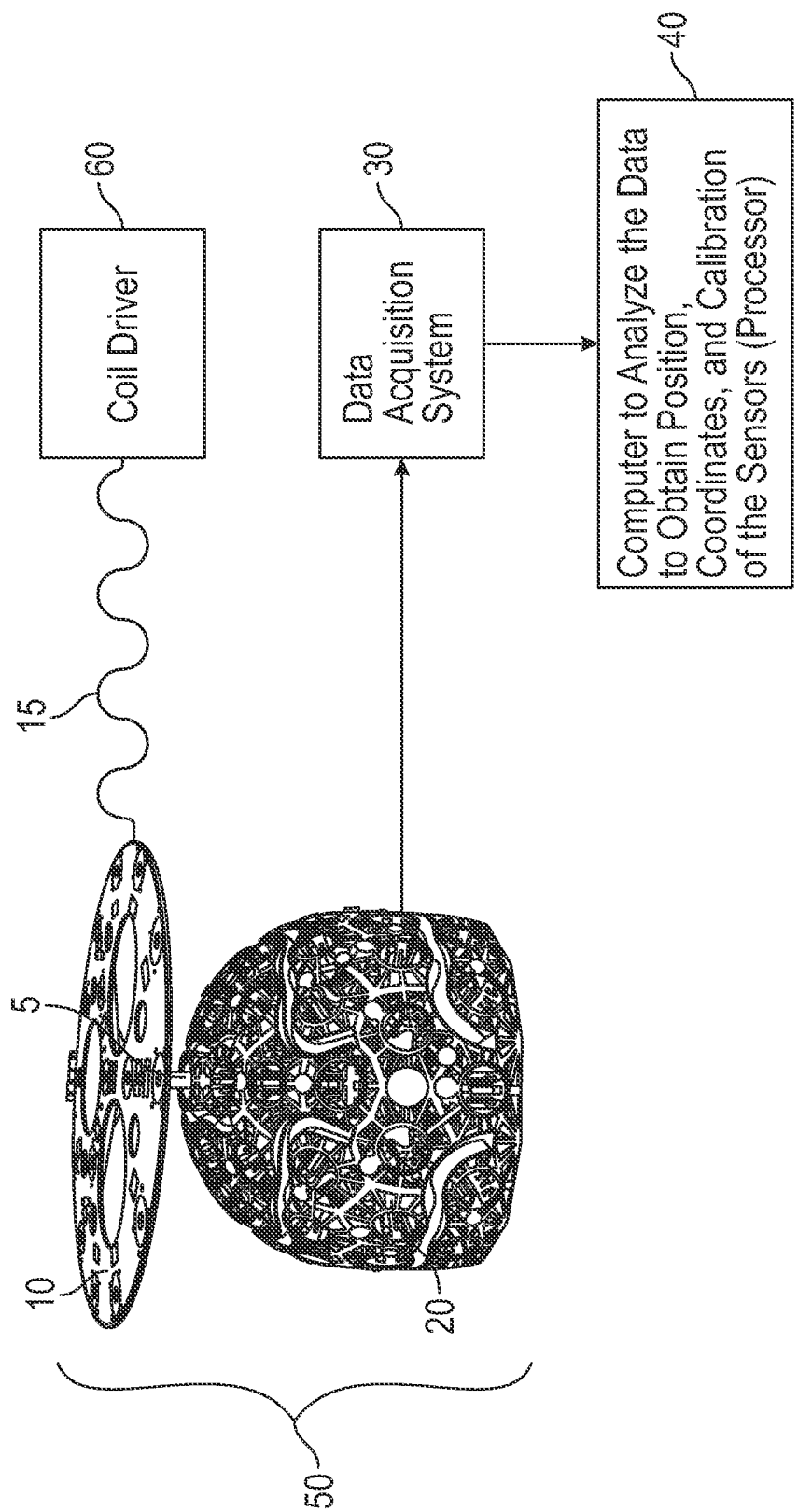
FIG. 5 is an illustration of the system comprising an MEG helmet-PCB coil platform device of the present disclosure and a data acquisition system.

The response of each sensor to the magnetic field generated by the coils on the MEG helmet-PCB coil platform 50 is captured using a data acquisition system as illustrated in FIG. 5. The data acquisition system 30, which may comprise of a processor 30 and memory 40 units, may be connected in a wired or wireless manner such as over internet, Bluetooth, or other remote connection means. A display unit may be connected, wired or wirelessly to the processor/memory unit 30,40 to view data. Once the sensor responses are recorded, the data is subjected to analysis using established magnetic source localization algorithms. An example of such an algorithm is detailed in the Pfeiffer et al., 2020 work. These algorithms are designed to accurately determine the position, orientation, and optionally calibration of each sensor in relation to the frame of reference established by the PCB coil platform coil coordinates.

A simplified variant of the algorithm described in Pfeiffer et al., 2020 work is described herein for clarity by the following.

$S_{k,j}$ is the predicted response from the k-th magnetometer by the j-th PCB coil. Considering the PCB coils to be ideal dipoles, the response $S_{k,j}$ is given by, $$S_{k,j} = \frac{\mu_0}{4\pi} \frac{3(r_{j,k} \cdot m_j)r_{j,k} - m_j|r_{j,k}|^2}{|r_{j,k}|^5} \cdot n_k \quad \text{(Eq. 2)}$$

Where, $\mu 0$ is the permeability of free space, $r_{j,k}$ is a vector defining the location of the dipole j relative to sensor k, $m_j$ is the magnetic moment of the dipole coil j, and $n_k$ combines the orientation ($\hat{n}_k$) and responsivity of the sensor k ($|n_k|$). If $S_{jk}^{rec}$ is the actual recorded response from the sensor, using numerical optimization to minimize the function $\Sigma_{i=1}^{j}|S_{ik}^{rec}-S_{ik}|^2$, the position, orientation, and optionally calibration of the k-th magnetometer can be obtained, assuming the coil position and orientations are predefined by the PCB coil platform.

In addition to position, orientation, and optionally calibration, additional sensor parameters can also be calculated based on system requirements. These include parameters such as sensor response linearity and the frequency dependent response of the sensors. By varying the characteristics of the current applied to the individual coils in the PCB coil platform, such as changing the current's amplitude, frequency, or waveform, different sensor characteristics can be obtained.

The sensor parameters, such as position and orientation, obtained using numerical optimization are in the 3D reference frame in which the position and orientations of the PCB coils were defined. While this provides accurate localization of the sensors relative to the PCB coils, it is also necessary to translate these coordinates into a frame of reference associated with the subject's head for practical application in MEG studies. To achieve this transformation, traditional head position indicator (HPI) coils or 3D scanning can be employed.

To obtain the positions of facial features in PCB coil frame of reference using HPI coils, the HPI coils are attached to fixed locations on the subject's face, such as the earlobes or the nose bridge, and energized in a manner similar to the PCB coils. Using the position, orientation, and optionally calibration information of the magnetometers obtained in previous steps, the positions and orientations of the HPI coils can be obtained using numerical optimization to minimize $\Sigma_{i=1}^{k}|S_{mi}^{rec}-S_{mi}|^2$, where index m denotes the m-th HPI coil.

To summarize, the process begins with using PCB coil platform to obtain the position, orientation, and optionally calibration of the magnetometers. Subsequently, HPI coils are attached to identifiable features on the subject's face. Utilizing the magnetometer's position, orientation, and if needed, calibration data, the position of the HPI coils is ascertained. This, in turn, allows for the determination of the facial features' positions in relation to the magnetometers which is crucial for MEG.

Figure 9:
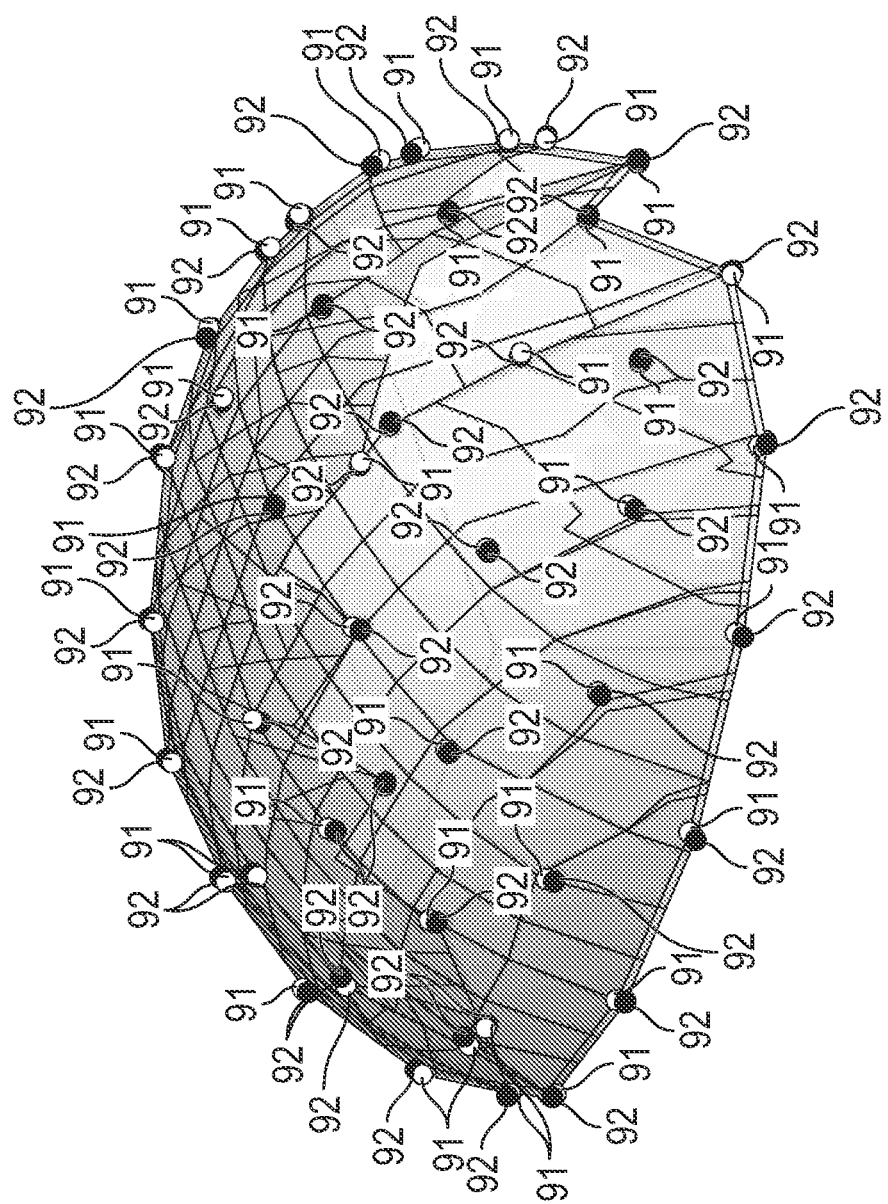
FIG. 9 illustrates data generated from the device of the present disclosure on an MEG helmet.
Figure 11:
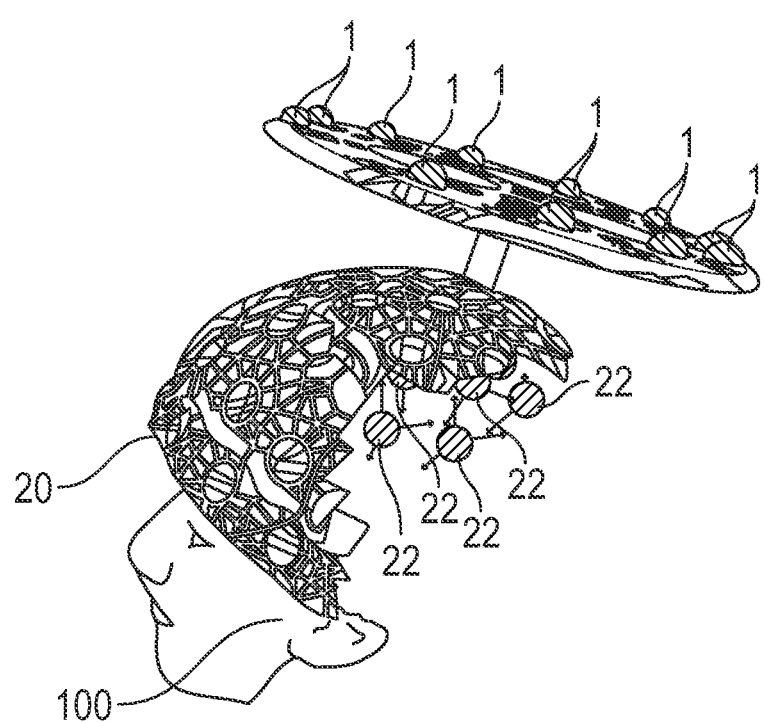
FIG. 11 illustrates successful extraction of positions and orientations of the sensors in the helmet with respect to subject head using a planar PCB coil array mounted over the helmet using the method described herein.

Another approach to co-register the facial features with respect to the PCB coil platform is using 3D scanning. In this approach, the subject and the PCB coil platform are digitized together using a 3D scanner. There are several 3D scanning technologies that can be used such as lidar or photogrammetry that can be utilized for this purpose. After digitization, a virtual 3D digital representation of the PCB coil platform and subject are obtained together in the same 3D file as illustrated in FIGS. 9 and 11. As illustrated in FIG. 11, an MEG helmet 20 may be placed on a subject's head 100. The subject 100 may be a human person, or other subject such as an animal. A PCB coil platform 10 is rigidly attached to the helmet 20. Using the 3D file, co-ordinates of the facial features with respect to the PCB platform can be easily obtained using any 3D modelling software and mapped and viewed as illustrated in FIG. 9. Furthermore, using the PCB coil 1 locations, locations of the magnetic sensors 22 can be ascertained as described herein.

With 3D scanning, there are now two distinct cartesian co-ordinate systems with different origins, orientation, and in some cases also the units. In the first co-ordinate system, the position and orientation of the magnetometers are known and defined with respect to the co-ordinate system used to define the position of the coils on the PCB platform. In the other co-ordinate system, the origin and orientation of the co-ordinate system is chosen somewhat arbitrarily by the 3D scanner. To obtain the facial features and magnetometers in the same co-ordinate system, a 3D transformation including rotation, translation, and scaling to one of the co-ordinates system can be applied, using the knowledge of the spatial features on the PCB coil platform which is present in both co-ordinate system.

EXAMPLES

Example 1

Figure 6:
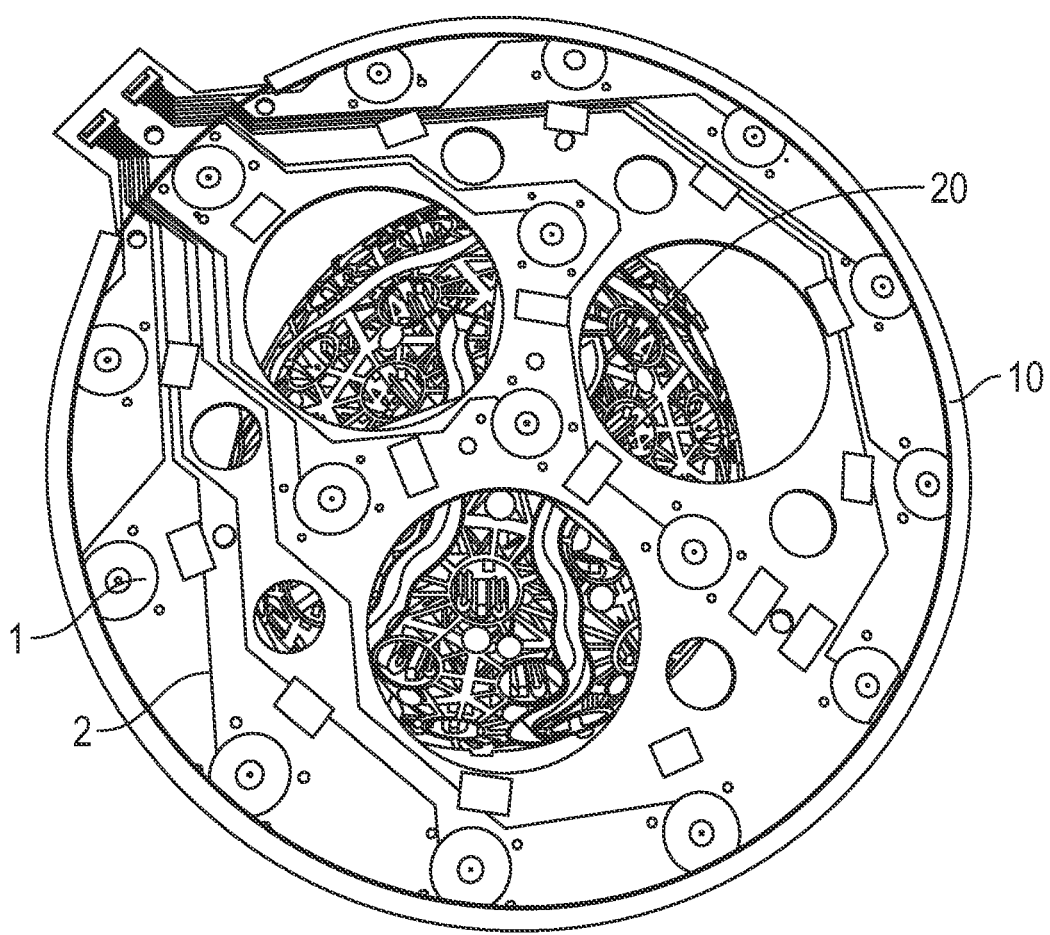
FIG. 6 is a top view illustration of the PCB platform of the present disclosure.

As an example, a PCB coil platform 10, as described in FIG. 3 and shown in FIGS. 4-6, was constructed from an FR4 substrate, a material chosen for its rigidity and standard use in PCB manufacturing. The PCB coil platform 10 was fabricated with a circular shape incorporating three hollow cutouts or spaces 12 in the center of the platform to reduce weight. These cutouts 12 were dimensionally optimized to maintain structural integrity while minimizing the overall mass of the PCB coil platform 10. The diameter of the PCB coil platform 10 from the outer edges, or outside diameter, measured 280 mm (11.02 inches), and had a thickness of 1.62 mm (0.06 inches). The outside diameter of the PCB coil platform 10 was chosen to be roughly equal to diameter of an adult OPM-MEG helmet FIG. 4, 20 enabling the coils to be maximally spaced away from each other and provide a more uniform coverage over all the sensors in the helmet. The 1.62 mm PCB coil platform 10 thickness was chosen to provide rigidity while keeping the helmet-platform lightweight and complying with standard PCB manufacturing specifications.

This PCB coil platform 10 was assembled as a multilayer structure, comprising six layers of conductive copper traces. The PCB can be made from as many as 128 layers, or more, to increase the number of turns in each magnetic coil. On the surface of the PCB coil platform 10, sixteen magnetic coils 1 were positioned symmetrically, as depicted in FIG. 6.

As illustrated in FIG. 3, each coil 1 was made as a group of vertically stacked multi turn loops formed of electrically conductive copper trace shaped as an Archimedes spiral on each of the six layers, with seven turns in a spiral loop on each PCB layer. Coil trace width and spacing were minimized to pack more coil turns, or loops, into the given surface area while meeting standard PCB manufacturing specifications. Each PCB coil 1 has an outer diameter of 1.3 cm.

The PCB coil in the first layer, 3a as depicted in FIGS. 1-2, initiates from the entry point at the outermost turn, spiraling inward to the center. Near the termination of the spiral, a conductive VIA, or vertical interconnect access, transitions the current from layer 3a to layer 3b. The spiral on layer 3b is a continuation of the trace from layer 3a but in a mirrored fashion, allowing the current to flow from the innermost point of the spiral outward to the periphery. In this design, the current enters the spiral on odd-numbered layers at the outermost turn and on even-numbered layers at the innermost turn, with the direction of current flow remaining the same on each layer.

While the PCB coil platform of the present example employed circular Archimedean spirals, the coil geometry can be varied. Alternative shapes, such as square or hexagonal spirals, are also feasible and can be tailored to meet specific requirements, ideally ensuring that the field pattern generated by the coil can be easily calculated.

To calculate the dipole moment of the PCB coil, the spiral loops in the coil can be approximated as being made up of concentric rings. The magnetic moment of each ring is given by $\mu_l = i \times A_l$, where i is the current through each ring and $A_l$ is the area enclosed by the $l^{th}$ ring. Since the same current passes through all the rings in a coil, the dipole moment of the PCB coil is given by $\mu_c = i \Sigma_{l=1}^{n} A_l$, where $\mu_c$ is the dipole moment of the coil and n is the number of rings in a coil. In our example, each spiral loop on every layer was approximated as consisting of seven concentric and equidistant rings. The radius of the outermost ring was set at 6.5 mm, and the innermost ring at 4 mm. Six loops were vertically stacked and aligned concentrically on six different layers of the PCB, effectively approximating the coil as being composed of 42 concentric rings.

Alternatively, the coil's dipole moment can be experimentally measured using Eq. 1, with a calibrated magnetometer positioned at a known location and orientation. If all PCB coils in an array are designed identically, the inherent precision of PCB manufacturing implies that measuring the dipole moment of one coil is sufficient, it can be assumed that the remaining coils possess the same dipole moment.

If the PCB coil and the magnetometer are separated by a distance several times greater than the effective diameter of the PCB coils, this separation enables the treatment of the PCB coils as an ideal magnetic dipole. For instance, if the diameter of a PCB coil is 1 cm, then its magnetic field distribution at a distance 3-5 cm or more away can be approximated by ideal dipolar field, with an inaccuracy of less than 1%.

In scenarios where the PCB coils are closer to the magnetometer or the ideal dipole approximation is not sufficiently accurate, closed-form analytical solutions for the PCB coil field can be computed. However, to sidestep the complexity associated with these calculations, in this example, the PCB coil array was positioned about 5 cm away from the magnetometer.

Figure 7:
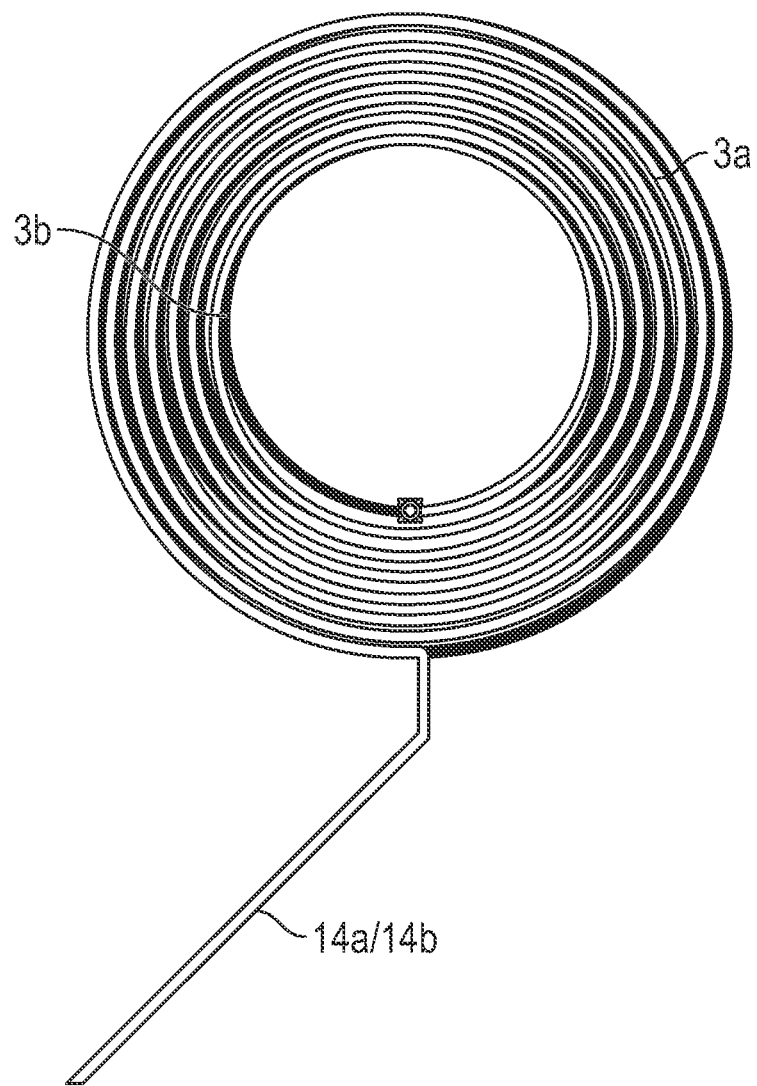
FIG. 7 is a schematic diagram illustrating layering of the electrically conductive traces in the PCB of the present disclosure.

In the design of the present PCB coil platform 10, FIGS. 4-6, a critical consideration is the arrangement of the conductive traces 14a/b that provide electrical current to the coils. As illustrated in FIG. 7, to minimize the production of stray magnetic fields, the connecting trace 14a that carries the current into the coil layer 3a was placed directly above the connecting trace 14b that carries the current out to a different layer 3b of the PCB. Misalignments may occur near the conductive vias or at the connector interface where the PCB connects to the external cables. These misalignments were designed to enclose the smallest possible loop area to keep the stray magnetic field they produce as small as possible.

This precise overlap was crucial because any deviation could result in the formation of a loop between the input and output connecting traces. Such loops can produce a stray field. Reducing the stray magnetic field from the wires and traces that power the coils is imperative for accuracy. This is because the wires and traces that power the coils carry the same periodic AC current as the coils, and therefore any stray magnetic fields that the traces and wires produce are indistinguishable from the desired magnetic field produced by the coils. Modeling stray fields accurately is possible but can be challenging; hence, the design aims to keep the stray fields as low as possible. Ideally, the stray field should be less 1%, ideally less than 0.1% of the field generated by an individual coil to meet the accuracy requirements for sensor position/orientation localization at the 1 mm/1 degree level.

Additionally, the wires, that bring current to power the PCB, were tightly twisted to minimize stray magnetic fields from the wires. This precaution ensures that the incoming and outgoing wires do not form a substantial loop that could generate a significant fringe magnetic field. The practice of twisting wires is a well-established method for reducing the loop area and, consequently, magnetic interference. A single thirty-two conductor cable, consisting of sixteen twisted wires, delivered the current from the control electronics to the sixteen coils on the PCB coil platform. In our example, the stray field from the wires and conductive traces was measured at the sight of the magnetic field sensor to be 0.54% of the magnetic field produced by the coil at 20 cm away from the coil. The measurement of the stray field was conducted by disconnecting the coil and substituting it with a conductive trace to measure the magnetic field generated solely by the conductive traces and the wires.

As illustrated in FIGS. 4-6, the PCB coil platform 10 was mounted at a distance of a few centimeters from the closest sensor in the array. In the present example, the PCB coil platform 10 was rigidly connected to the MEG helmet 20 using a rod 5 that was 7.5 cm long, as seen in FIGS. 4-5. This physical separation allowed the coils on the PCB coil platform 10 to be approximated as ideal point current dipoles. Since the PCB coil platform 10 was rigidly attached to the helmet 20, co-registration can be conducted while the subject was wearing the helmet, and if the subject's head moved, the PCB coil platform 10 moved with the helmet 20, maintaining a constant relative distance to the sensors on the helmet.

If head movement is constrained, such as with an infant who is stationary in a bed, the PCB coil platform 10 can simply be placed near the infant's head. A key consideration in positioning the PCB coil platform is that is important is that the magnetic field generated by the coils should not saturate the sensors because the PCB coil platform 10 is too close, or the magnetic field is too weak to be detected by the sensors with an adequate Signal-to-Noise Ratio (SNR) because the sensors are too far away.

While this application was centered on MEG, the general approach is equally applicable to other applications that require similar sensor localization. This includes adult Magnetocardiography (MCG), where sensors are placed over the chest, or fetal Magnetocardiography with sensors placed over the mother's abdomen, or magnetomyography where sensors are placed over a different region of the body such as hands and legs. The PCB coil platform can be utilized to determine the position, orientation, and optionally calibration of the sensors, independent of the application for which the magnetic sensors are used.

In the present example, each coil was powered independently with a periodic current at a known frequency or a known temporal variation and a known current amplitude. For simplicity, we assumed that each coil was powered with an AC current given by: $I_x = A_x \sin(2\pi f_x t + \varphi_x)$, where $I_x$ was the current through coil number x, $A_x$ was the amplitude of the AC current, $f_x$ was the frequency of the AC current through coil, $\varphi_x$ was the phase of the AC current through coil x and t was the parameter for time. Other convenient functional forms for the current can also be chosen.

The coils were powered individually one at a time with the same frequency, $f_x$, for all coils. Alternatively, the coils can be powered simultaneously or in groups to speed up the co-registration process by choosing a different frequency, $f_x$, for each coil that is powered on simultaneously. The amplitude, $A_x$, was chosen to be as large as possible without saturating the sensors.

A subject wore a fixed OPM-MEG helmet 50 as shown in FIGS. 4 and 11. An array of sixty-four triaxial OPM sensors were inserted in each of the sixty-four slots in the helmet 20. The PCB coil platform 10 was placed over the helmet 20 as seen in FIGS. 4 and 11.

Each coil in the PCB coil platform 10 was sequentially powered on for one second at the same frequency (10 Hz). The time when each coil was powered on or off was tracked with digital triggers for signal analysis signal during data post processing. As illustrated in FIG. 5, the digital triggers, coil current, as well as the magnetic field response by all sixty-four OPM sensors were recorded using a data acquisition system 30 run on by a processor 40. Both the data acquisition system 30 and processor 40 are both computing devices, that comprise electronic processing units and optionally memory. As illustrated in FIG. 5, a coil driver 60 supplies power to each of the PCB coils through wires attached to the traces.

Each triaxial OPM sensor outputs three independent magnetic field measurements corresponding to the X, Y, and Z axis of the sensor, thus 64×3=192 independent sensor outputs were recorded.

Four separate sets of sixteen second measurements were recorded, in which each of the sixteen PCB coils were powered on for one second. In each set, a different current amplitude was chosen including the following Set 1, 2, 3, and 4.

Set 1: $A_x = 0.1$ (arb. units), $f_x = 10$ Hz[for all coils]

Set 2: $A_x = 0.3$ (arb. units), $f_x = 10$ Hz[for all coils]

Set 3: $A_x = 0.6$ (arb. units), $f_x = 10$ Hz[for all coils]

Set 4: $A_x = 1.0$ (arb. units), $f_x = 10$ Hz[for all coils]

Figure 8:
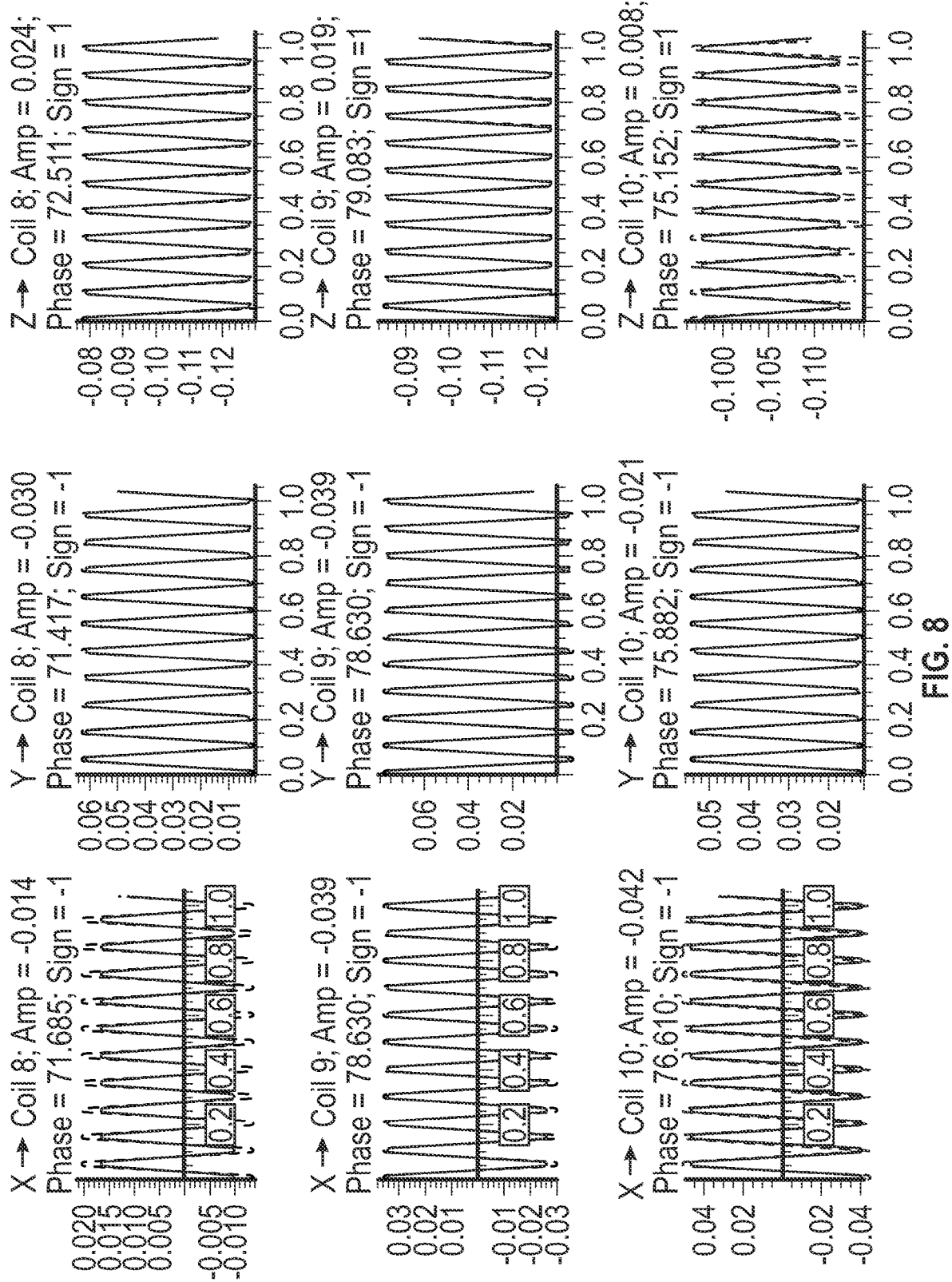
FIG. 8 shows graphical representation of data generated from the device of the present disclosure.

The response of each sensor to the magnetic field applied by each coil was estimated during post processing by fitting a parameterized sine wave at 10 Hz to each of the three axis sensor outputs from each of the sixty-four sensors as shown in FIG. 8, which shows example response from one of the OPM magnetometers to the AC magnetic field applied by a few PCB coils.

This process enabled an accurate measurement of each sensor's response including amplitude and sign (direction) to the magnetic field produced by each of the sixteen PCB coils. The process was repeated across all four sets of data in which a different coil amplitude was used in each set. If the sensor response amplitude was too high, near sensor saturation, or too low, low signal-to-noise ratio, then the corresponding segment of the data was excluded during post processing.

Once the sensor responses to coil activations for a given coil current were obtained, localization procedure described in Pfeiffer et. al., 2020 was used to obtain the position, orientation, and optionally calibration of each sensor in the helmet with respect to the known position of the PCB coils. In the analysis, the X, Y, Z outputs of each triaxial OPM sensor were considered as an independent one axis sensor. The following parameters were obtained with the localization procedure for sensor number i (1-64).

$$\{a^i_x, b^i_x, c^i_x, \theta^i_x, \varphi^i_x, c^i_x\}$$

$$\{a^i_y, b^i_y, c^i_y, \theta^i_y, \varphi^i_y, c^i_y\}$$

$$\{a^i_z, b^i_z, c^i_z, \theta^i_z, \varphi^i_z, c^i_z\}$$

Where, $a^i_x$, $b^i_x$, $c^i_x$ were the sensor positions; $\theta^i_x$, $\varphi^i_x$ were the orientation angles, and $c^i_x$ was the magnetic field calibration of the sensor-i treating x-axis output from sensor-i as an independent single-axis sensor. Similarly, the parameters with y and z subscripts were obtained by treating y and z outputs of the $i^{th}$ triaxial OPM sensor as independent single-axis sensors.

In a triaxial OPM sensor in which the X, Y, Z outputs are co-located at the same position, obtaining localization results for each sensor such that: $a^i_x \approx a^i_y \approx a^i_z$, $b^i_x \approx b^i_y \approx b^i_z$, and $c^i_x \approx c^i_y \approx c^i_z$ confirmed the validity and accuracy of the localization process.

The use of six coils, or another number of coils, being five, ten, twelve, fourteen, or sixteen, or eighteen, or twenty, or twenty-four, or twenty-eight, or thirty-two, or more, with four different amplitudes to solve for just six independent parameters is not generally essential, and it is possible to greatly speed up the co-registration process using fewer coils and/or fewer sets of coil current amplitudes.

In addition to the six parameters for each axis that were obtained in the present example case, it is possible to obtain additional sensor parameters using the PCB coil platform system disclosed herein, such as sensor spectral response or the amplitude response. The spectral response can be obtained by powering the coils at different frequencies and measuring the dependency of the sensor output amplitude and phase on magnetic field frequency. Such information can be used to linearize the spectral response of the sensor. Similarly, the sensor calibration can also be linearized by measuring the sensor output amplitude as a function of the magnetic field amplitude.

FIG. 9 shows the results of position reconstruction of each of the sixty-four sensors in the helmet using the setup shown in FIG. 5. In FIG. 9, the open circles 91 were the actual physical positions where sensors known from geometry of helmet and the filled circles 92 were the reconstructed sensor positions using the PCB coil platform and the localization approach outlined above. The average positional error between the reconstructed and the expected positions (from helmet geometry) of the sensors in helmet was roughly 1.5 mm or less. Similarly accurate results were obtained for calibration and orientation accuracy of the reconstruction process. The approach described here achieved relatively high accuracy in determining the sensor's position and orientations, indicating that the stray fields were effectively reduced to negligible levels.

FIG. 9 shows the positions obtained using the X-axis output from each OPM sensor. Nearly identical positional results within 2 mm accuracy were also obtained using the Y, and Z outputs of the magnetometers.

Figure 10:
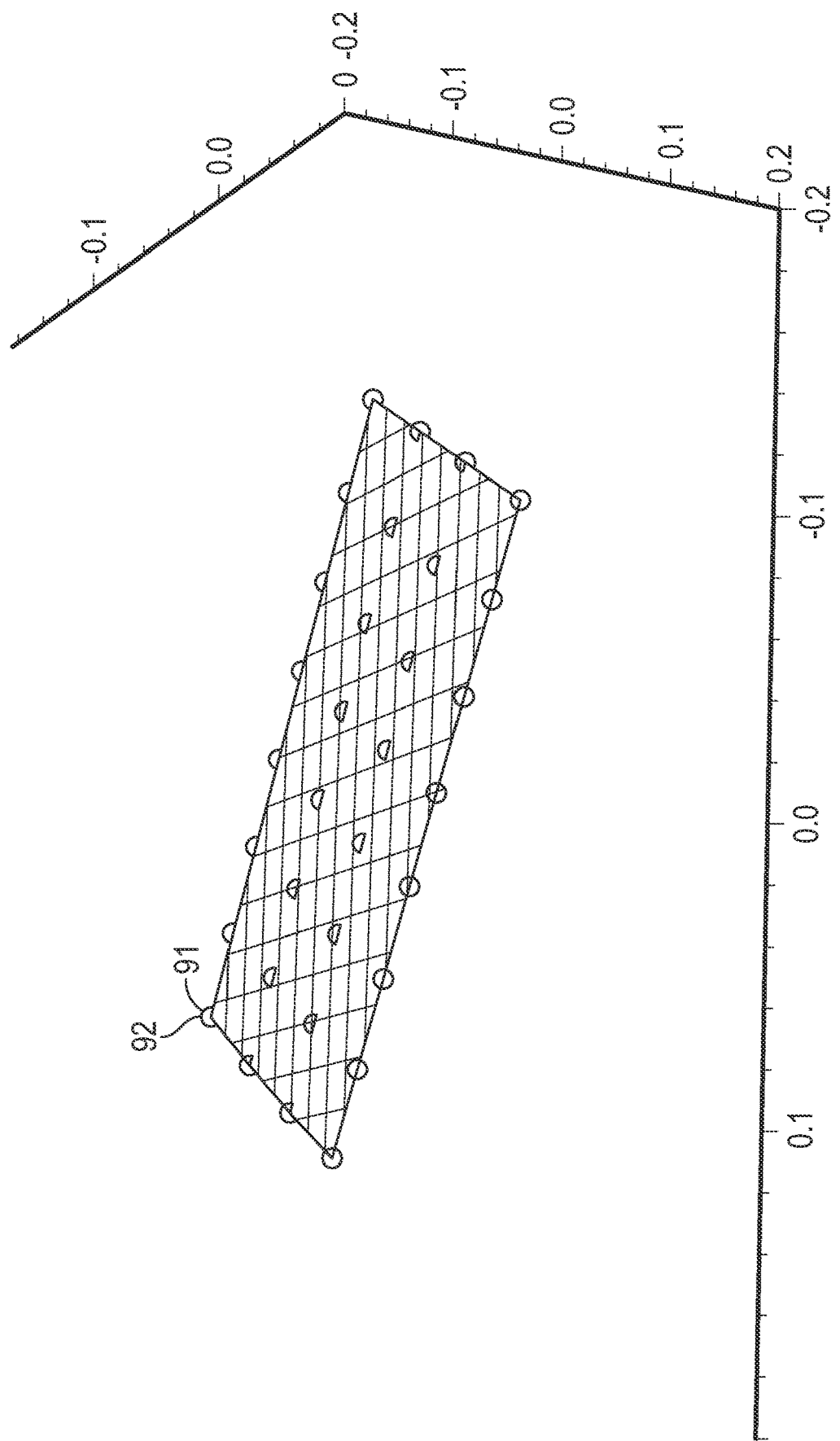
FIG. 10 illustrates data generated from the device of the present disclosure wherein sensors were placed on a planar mount.

FIG. 10 shows similar accuracy in position reconstruction when the sensors were placed in grid in a planar rectangular mount using a similar setup with the PCB coil platform as described for FIGS. 4-6 of the present Example 1. The results demonstrate the versatility of using the PCB coil platform system to obtain localization parameters of arbitrarily positioned and oriented sensors.

Once the positions and orientations of the sensors relative to the PCB coils are established, the next crucial step involves mapping these sensor coordinates to the subject's head and face reference frame. To achieve this, we employed a 3D scanner based on the iPhone 15 Pro's Face ID technology. The subject was 3D scanned with the iPhone while they were wearing the helmet mounted with PCB coils, as illustrated in FIG. 5. The 3D scan captures both the subject's head and the PCB coils, creating a digital model. This model was then exported to a PC, and using CAD software, the positions of the PCB coils were extracted within the 3D scanner's frame of reference.

Subsequently, a combination of rotational, translational, and scaling transformations was applied to the model's frame of reference. This step ensured alignment of the PCB coils' coordinates across both reference frames. By applying this transformation to the 3D model, the subject's head and face were brought into the same reference frame as the PCB coils, thereby completing the co-registration process. As a result, we obtained a detailed mapping of the sensors' coordinates in relation to the subject's anatomical features, effectively linking the sensor data to the subject's physical structure.

FIG. 11 illustrates the outcome of the co-registration process detailed in this example, where the positions and orientations of the sensors 22 on the MEG helmet 20 relative to the subject's head 100 were successfully obtained. In this figure, the half-spheres 1 represent the positions of the coils 1, indicating their precise locations in the context of the subject's head 100. The whole spheres 22 in the image denote the locations of the individual sensors as they were positioned over the head 100. This visual representation clearly demonstrates the effective alignment of the sensor array with the anatomical features of the subject's head, achieved through the co-registration process.

Example 2

Figure 12:
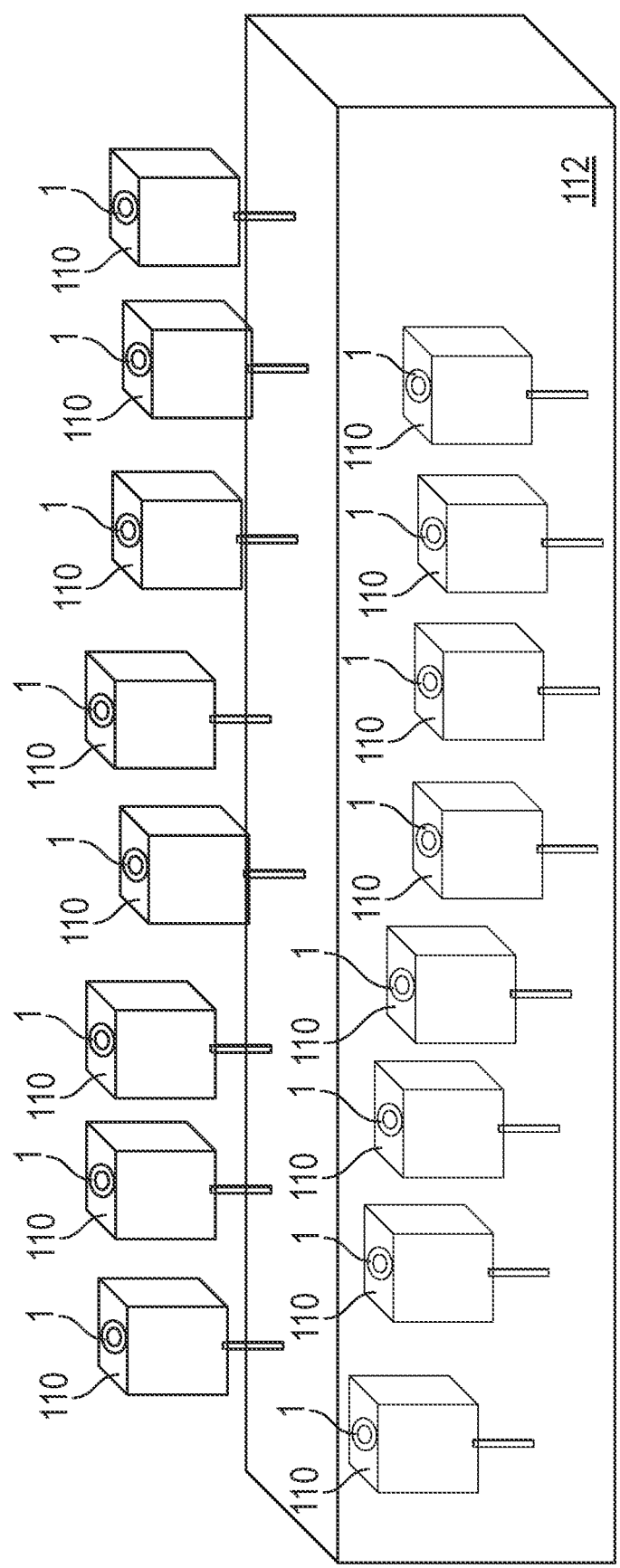
FIG. 12 illustrates a second example device of the present disclosure.

In this embodiment, as illustrated in FIG. 12, sixteen separate PCBs 110, each containing one or more Archimedean spiral PCB coils 1, may be constructed. The individual PCB coil structures 110 will be affixed to predefined locations on a rigid surface 112 that forms the PCB platform. The placement and orientation of the coils will be known from the geometry of this surface, eliminating the need for external methods, such as 3D scanning, to determine where the PCB coil structures 110 will be attached. The rigid surface 112 to which the separate PCB coil structures 110 will be attached and can be manufactured using standard manufacturing techniques or with 3D printing. The individual PCB coil structure 110 manufacturing approach can be kept similar to that described in Example 1.

Sixteen individual twisted pairs of wires connected thereto will carry the current to and from the control electronics 30/40 as illustrated in FIG. 5. The control electronics would not be modified from that described in Example 1. This composite array of coils can be rigidly affixed to a rigid surface, preventing any relative motion between the sensors and the coils. Because each coil will be constructed from a rigid PCB, the magnetic moment, effective radius, and geometry were extremely consistent across all coils, eliminating the need for individual coil calibration. Only the geometric model would need to be updated in the data processing steps.

Adopting a non-planar shape for the PCB coil platform, rather than the planar design of Example 1, can be beneficial in applications where distributing coils is essential to achieve uniform coverage over all sensors. This approach becomes particularly relevant when space limitations make a single, unified, planar PCB impractical.

In other examples, each magnetic coil may be mounted on a separate PCB. These individual PCBs can be arranged in a specific geometrical pattern, with each connecting to the control electronics through its own wire. As in all examples, the electromagnetic coils formed in the PCBs, whether in one structure, or in several PCB structures, need only be placed near or proximate to the magnetic sensors. The range of distance between the electromagnetic coil or coils, or electromagnetic coil array and the sensors may be as little as 0.5 cm, or as little as 1.0 cm, or as little as 1.5 cm, or as little as 2.0 cm, or as little as 2.5 cm, or as, or as little as 3 cm, or as little as 3.5 cm, or as little as 4 cm, or as little as 4.5 cm, or as little as 5 cm, or as little as 6 cm, or 7 cm, or 8 cm, or 9 cm, or 10 cm, or 15 cm, or 20 cm, or 25 cm, or 30 cm, or 40 cm, or 50 cm, or 60 cm, or as much as a meter.

Example 3

The PCB coil array was fabricated on a single PCB substrate. However, the substrate may be made from sections that are rigid and some sections that are flexible. For example, the sections of the PCB substrate directly under the coil structure may be rigid to provide structural rigidity of the coil while other sections of the PCB substrate may be flexible allowing the overall coil array to be deformed into a desired shape. Alternatively, the PCB substrate can be completely flexible. Such rigid-flexible and fully flexible PCBs are a standard product made by PCB manufacturers. The PCB substrate may be then attached to a rigid substrate or platform with the coils attached at known locations on the rigid substrate. The locations of the coils on the platform may be predetermined from its geometry or can be determined using techniques such as 3D scanning or with manual measurements. The procedure for sensor coordinate extraction remains the same as in Example 1.

Both rigid-flexible, or partially flexible, and fully flexible PCB configurations are standard offerings from PCB manufacturers, leveraging existing technologies for efficient production. The rigid parts are typically made from FR4 material, known for its mechanical stability and electrical insulation properties, while the flexible parts utilize polyimide or similar materials, providing the needed pliability.

The PCB substrate, whether rigid-flexible or fully flexible, may be subsequently attached to a rigid platform. The coils on the PCB substrate should be mounted at precise, known locations on this rigid structure. The positioning of the coils on the platform is determined based on the geometry of the platform itself or can be ascertained using techniques such as 3D scanning or manual measurements. The process of sensor coordinates extraction and co-registration employed in this embodiment is consistent with the procedures outlined in Example 1 of this patent application.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A system for determining position and orientation of individual magnetic field sensors in an array of at least two magnetic field sensors, comprising:
    a) a rigid structure comprising an array of at least five electromagnetic coils, wherein the at least five electromagnetic coils are made of at least five electrically conductive coil traces;
    b) wires that connect to and power each of the at least five electromagnetic coils;
    c) at least one printed circuit board (PCB) comprising at least one conductive layer, with the at least five electromagnetic coils constructed in the at least one PCB;
    d) wherein a placement and orientation of the at least five electromagnetic coils on the rigid structure is predetermined;
    e) wherein the at least five electromagnetic coils each comprise a predefined magnetic moment per unit current;
    f) wherein the system is configured such that, for each of the at least five electromagnetic coils, a magnetic field emanating from the wires powering the at least five electromagnetic coils, as measured at a location of each of the at least two magnetic field sensors, is substantially lower than any one of at least five magnetic fields emanating from the at least five electromagnetic coils; and
    g) wherein a processor is configured to determine three position coordinates and two orientation angles of each of the at least two magnetic field sensors in the array using knowledge of the magnetic moment per unit current of each of a selected five of the at least five electromagnetic coils, a current through each of the selected five electromagnetic coils, and the predetermined placement and orientation of each of the selected five electromagnetic coils.

2. The system of claim 1, wherein each of the at least five electromagnetic coils are configured to be powered independently of each of the other at least five electromagnetic coils.

3. The system of claim 1 further comprising at least one electrically conductive connecting trace connecting at least one of the at least five electromagnetic coils and the wires.

4. The system of claim 3, wherein the electrically conductive connecting trace is copper.

5. The system of claim 1, wherein each of the wires powering the at least five electromagnetic coils comprise a current carrying wire and second wire, and wherein the current carrying wire is twisted around the second wire.

6. The system of claim 1 further comprising at least one ground wire and wherein each of the wires powering the at least five electromagnetic coils comprise at least one current carrying wire, and wherein each of the at least one current carrying wires) are twisted around the at least one ground wire.

7. The system of claim 1 further comprising at least one additional electromagnetic coil and a wire to supply power to the at least one additional electromagnetic coil, such that a calibration of the at least two magnetic field sensors may be determined.

8. The system of claim 1, wherein each of the at least five electromagnetic coils has a surface area sufficiently small such that when each of the at least five electromagnetic coils are powered to generate the magnetic fields emanating from the at least five electromagnetic coils, the magnetic fields emanating from the at least five electromagnetic coils can be approximated as an ideal dipole coil at the location of each of the at least two magnetic field sensors with an accuracy of within 1%.

9. The system of claim 1 wherein the processor is configured to analyze a response of each of the at least two magnetic field sensors to a magnetic field generated by each of the at least five electromagnetic coils to determine the three position coordinates and the two orientation angles of the at least two magnetic field sensors.

10. The system of claim 1, wherein the rigid structure is the at least one PCB with the at least five electromagnetic coils constructed therein.

11. The system of claim 1, wherein the array of at least five electromagnetic coils is constructed within a flexible PCB, and wherein the at least five electromagnetic coils from the flexible PCB are rigidly affixed at the predetermined placement and orientations on the rigid structure.

12. The system of claim 1, wherein each of the at least five electromagnetic coils are fabricated in individual PCBs and attached to the rigid structure at a specified location and orientation.

13. The system of claim 1, wherein at least one of the at least five electromagnetic coils is fabricated using a technique other than PCB construction while the remaining electromagnetic coils are fabricated from PCBs, and wherein each of the at least five electromagnetic coils are mounted on the rigid structure at a specified location and with a specified orientation.

14. The system of claim 1, wherein the at least five electromagnetic coils are configured to be energized in a sequential manner, with each of the at least five electromagnetic coils being configured to be powered on to create an individually defined magnetic field individually and sequentially.

15. The system of claim 1, wherein at least two of the at least five electromagnetic coils are configured to be energized concurrently, with the at least two of the at least five electromagnetic coils configured to be powered simultaneously using oscillatory currents at differing frequencies.

16. The system of claim 1, further comprising a three-dimensional (3D) scanning device for digitizing a spatial relationship between a subject and the rigid structure, wherein:
   a) the 3D scanning device is configured to generate a 3D digital representation of the subject and the rigid structure as a unified model; and
   b) the system is configured to utilize the 3D digital representation to establish the spatial relationship between the subject and the at least two magnetic field sensors affixed to the rigid structure, enabling accurate co-registration of the at least two magnetic field sensors with respect to the subject.

17. The system of claim 1, wherein the at least five electrically conductive coil traces are copper.

18. The system of claim 1, wherein the magnetic field emanating from the wires powering the at least five electromagnetic coils, as measured at the location of each of the at least two magnetic field sensors, is less than 1% of the magnetic field produced by each of the at least five electromagnetic coils.

19. The system of claim 1, wherein the three position coordinates and the two orientation angles of the at least two magnetic field sensors are calculated using the array of the at least five electromagnetic coils.

20. The system of claim 1, wherein the processor utilizes the magnetic fields emanating from no more than five electromagnetic coils of the at least five electromagnetic coils to determine the three position coordinates and the two orientation angles of each of the at least two magnetic field sensors in the array of at least two magnetic field sensors.

* * * * *